United States Patent
Abbasian et al.

(10) Patent No.: US 9,231,457 B2
(45) Date of Patent: Jan. 5, 2016

(54) DOUBLE STATOR SWITCHED RELUCTANCE APPARATUS

(75) Inventors: Mohammadali Abbasian, Isfahan (IR); Mehdi Moallem, Isfahan (IR); Babak Fahimi, Arlington, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 894 days.

(21) Appl. No.: 13/169,233

(22) Filed: Jun. 27, 2011

(65) Prior Publication Data

US 2011/0316366 A1 Dec. 29, 2011

Related U.S. Application Data

(60) Provisional application No. 61/358,583, filed on Jun. 25, 2010.

(51) Int. Cl.

| | |
|---|---|
| H02K 19/00 | (2006.01) |
| H02K 16/04 | (2006.01) |
| H02K 3/12 | (2006.01) |
| H02K 19/32 | (2006.01) |
| H02K 19/12 | (2006.01) |
| H02K 19/10 | (2006.01) |

(52) U.S. Cl.
CPC ............ *H02K 16/04* (2013.01); *H02K 3/12* (2013.01); *H02K 19/103* (2013.01); *H02K 19/12* (2013.01); *H02K 19/32* (2013.01)

(58) Field of Classification Search
CPC ..... H02K 19/103; H02K 16/04; H02K 16/02; H02K 3/12; H02K 3/28; H02K 17/06; H02K 17/14; H02K 19/12; H02K 19/32
USPC ................... 310/168, 112, 113, 114
See application file for complete search history.

(56) References Cited

U.S. PATENT DOCUMENTS

| | | | | |
|---|---|---|---|---|
| 5,081,388 | A * | 1/1992 | Chen | 310/266 |
| 5,345,133 | A * | 9/1994 | Satake | 310/266 |
| 5,545,938 | A * | 8/1996 | Mecrow | 310/156.64 |
| 6,459,185 | B1 * | 10/2002 | Ehrhart et al. | 310/156.45 |
| 7,723,888 | B2 * | 5/2010 | Petek | 310/156.35 |
| 2006/0131986 | A1 * | 6/2006 | Hsu et al. | 310/268 |
| 2006/0279155 | A1 | 12/2006 | Holtzapple et al. | |

* cited by examiner

*Primary Examiner* — Joshua Benitez-Rosario
*Assistant Examiner* — Leda Pham
(74) *Attorney, Agent, or Firm* — Schultz & Associates, P.C.

(57) ABSTRACT

A switched reluctance apparatus and method of operating the same. The apparatus has an inner stator having a plurality of poles, a rotor disposed radially outward of the inner stator and having a plurality of segments serving as poles, and an outer stator disposed radially outward of the rotor and having a plurality of poles. A respective winding is disposed between every pair of adjacent poles of either stator. The apparatus operates with a plurality of separately excitable phases, a given phase being excited by energizing the windings corresponding to the given phase. Excitation of a given phase causes induction of magnetic fluxes traversing a region substantially confined to the region of the stators and rotor segments corresponding to the given phase, and causes a substantial amount of flux to enter rotor segments not in the radial direction but perpendicular to the radial direction.

5 Claims, 12 Drawing Sheets

_US 9,231,457 B2_

DOUBLE STATOR SWITCHED RELUCTANCE APPARATUS

CROSS-REFERENCE TO RELATED APPLICATIONS

This application claims the benefit of the filing date of U.S. provisional patent application No. 61/358,583, incorporated herein by reference, which was filed on Jun. 25, 2010, by the same inventors of this application.

BACKGROUND OF THE INVENTION

1. Field of the Invention

This invention relates generally to switched reluctance apparatuses, and more particularly to switched reluctance apparatuses having alternative structural geometries, such as a double stator configuration, that optimize the distribution of magnetic flux.

2. Description of the Related Art

Conventional switched reluctance machines feature a rugged structure, robust performance in harsh ambient conditions, and low manufacturing cost. However, the majority of the electromagnetic forces generated by a conventional switched reluctance machine does not contribute to useful work, and a significant proportion of these forces generates undesirable vibrations that have been identified as a major drawback for such machines. Thus, limited torque density and energy conversion efficiency, among other characteristics, of conventional switched reluctance machines has limited their industrial applicability. Accordingly, there is a need for switched reluctance machines in which a higher proportion of the electromagnetic forces generated contributes to motion.

SUMMARY OF THE INVENTION

The present invention provides alternative structural configurations or geometries, which improve the distribution of induced magnetic flux and the flux path patterns, whereby a greater proportion of the forces generated contribute to useful work, or motion. This results in increased energy conversion efficiency and superior performance.

According to a first aspect of the invention, a switched reluctance apparatus comprises an inner stator having a plurality of poles, a rotor disposed radially outward of the inner stator and having a plurality of segments serving as poles, and an outer stator disposed radially outward of the rotor and having a plurality of poles. The rotor is configured for rotation with respect to the inner and outer stators. Between every pair of adjacent poles of either stator, a respective winding is disposed. The apparatus is adapted to operate as a machine having a plurality of separately excitable phases, each phase corresponding to a respective subset of the windings, and a given phase being excited by energizing the windings corresponding to the given phase.

According to a second aspect of the invention, in the switched reluctance apparatus of the first aspect the inner stator further has a back iron and the plurality of poles of the inner stator are connected to the back iron of the inner stator, and the outer stator further has a back iron and the plurality of poles of the outer stator are connected to the back iron of the outer stator. Excitation of any given phase of the switched reluctance apparatus of the second aspect causes induction of magnetic fluxes traversing not more than one quarter of the back iron of the inner stator and not more than one quarter of the back iron of the outer stator, and excitation of the given phase does not cause induction of magnetic fluxes in other portions of the back irons of the inner and outer stators.

According to a third aspect of the invention, the switched reluctance apparatus of the first aspect is further characterized in that each phase corresponds also to a respective subset of the poles. Excitation of any given phase of the switched reluctance apparatus of the third aspect induces magnetic fluxes traversing flux paths collectively encompassing (a) the poles corresponding to the given phase, (b) portions of ones of the segments that, during the excitation of the given phase, are located adjacent to the poles corresponding to the given phase, and (c) air gaps between the poles corresponding to the given phase and the portions of the ones of the segments located adjacent thereto during the excitation of the given phase, but excitation of any given phase of the switched reluctance apparatus of the third aspect does not induce any magnetic flux in poles not corresponding to the given phase.

According to a fourth aspect of the invention, excitation of any given phase of the switched reluctance apparatus of the first aspect induces magnetic fluxes, a substantial amount of flux lines thereof being prevented from entering ones of the segments in a radial direction and a substantial amount of flux lines thereof being caused to enter ones of the segments in a direction normal to the radial direction.

According to a fifth aspect of the invention, there is provided a method of operating a switched reluctance apparatus of the second, third or fourth aspect. The method comprises exciting the phases in sequence by energizing the subsets of the windings associated with the phases, respectively, in sequence.

According to a sixth aspect, in any of the first through fifth aspects each of the stators and segments comprises a respective laminated soft ferromagnetic material, and the cylindrical cage is formed of a non-ferromagnetic material.

According to a seventh aspect of the invention, a switched reluctance apparatus comprises an inner stator having a plurality of salient poles, a rotor disposed radially outward of the inner stator and having a cylindrical cage housing a plurality of non-projecting segments serving as poles, and an outer stator disposed radially outward of the rotor and having a plurality of salient poles. The rotor is configured for rotation with respect to the inner and outer stators. Each of the stators and segments comprises a respective laminated soft ferromagnetic material, and the cylindrical cage is formed of a non-ferromagnetic material. Between every pair of adjacent poles of either stator, a respective winding is disposed. The apparatus is adapted to operate as a machine having a plurality of separately excitable phases, each phase corresponding to a respective subset of the windings, and a given phase being excited by energizing the windings corresponding to the given phase. The cylindrical cage has a radially outward surface, and each segment has a respective radially outward surface that is flush with the radially outward surface of the cylindrical cage.

BRIEF DESCRIPTION OF THE DRAWINGS

It being understood that the figures presented herein should not be deemed to limit or define the subject matter claimed herein, the applicants' invention may be understood by reference to the following description taken in conjunction with the accompanying drawings, in which like reference numerals identify like elements, and in which:

Figure 1:
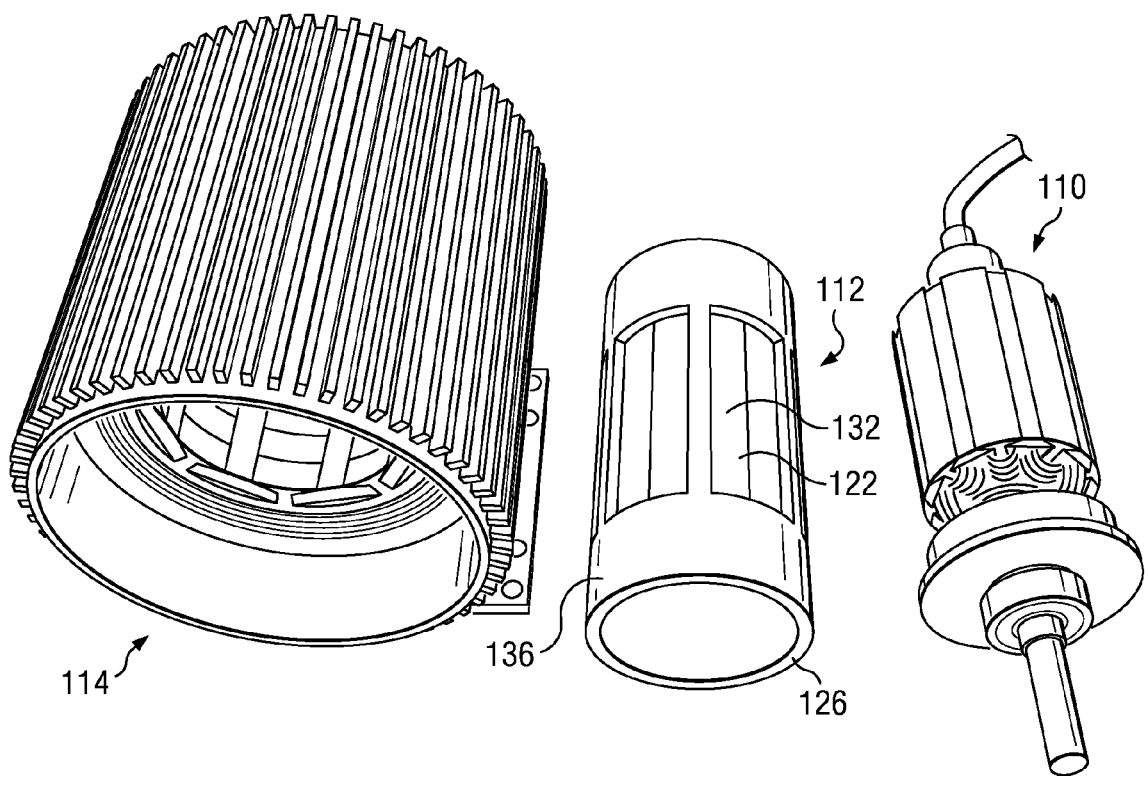
FIG. 1 is a perspective view showing parts of a disassembled switched reluctance apparatus, including an inner stator, a rotor, and an outer stator, in accordance with some embodiments of the present invention.

While the invention is susceptible to various modifications and alternative forms, specific embodiments thereof are shown by way of example in the drawings and are herein described in detail. It should be understood, however, that the drawings and description herein of specific embodiments are not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described herein. In the interest of clarity, not all features of an actual implementation are described in this specification. In the development of any such actual embodiment, numerous implementation-specific decisions must be made to achieve the design-specific goals, which will vary from one implementation to another. It will be appreciated that such a development effort, while possibly complex and time-consuming, would nevertheless be a routine undertaking for persons of ordinary skill in the art having the benefit of this disclosure.

Certain terms are used throughout the following description and claims to refer to particular system components. This document does not intend to distinguish between components that differ in name but not function. In the following discussion and in the claims, the terms "including" and "includes" are used in an open-ended fashion, and thus should be interpreted to mean "including, but not limited to," unless a specific use to the contrary is explicitly stated. The word "or" is used in the inclusive sense (i.e., "and/or") unless a specific use to the contrary is explicitly stated.

Embodiments of the present invention provide for a double stator switched reluctance apparatus, which is a variable reluctance synchronous machine designed to perform at high levels of energy conversion efficiency. The double stator switched reluctance apparatus is a singly-excited machine and has concentrated phase coils with a diametrical pitch, which are placed on the inner and outer stator poles and connected to form a multiphase machine. The magneto-motive force orientation of the coils is such that a short flux path may be created and maintained at all times. Although the description herein focuses on a double stator configuration, the present invention also encompasses apparatuses having more than two stators.

The inventors of the instant application compared the performance of a double stator switched reluctance apparatus with that of a conventional switched reluctance machine by employing a two dimensional finite element model and by constructing a prototype of a double stator switched reluctance apparatus. Using these investigative tools, the inventors analyzed the forces generated in operation of the double stator switched reluctance apparatus and in operation of a conventional switched reluctance machine. Based on this analysis, the inventors found that in a conventional switched reluctance machine the majority of the electromagnetic force generated is in a radial direction, perpendicular to the direction of motion. Ideally, motional force should be maximized and the radial component of force should be minimized. Compared to a conventional switched reluctance machine, the double stator switched reluctance apparatus was found to produce more motional force and less radial force or, in other words, a greater percentage of electromagnetic forces effectively acting in the direction of motion. In this regard, the energy conversion efficiency may be used as a metric to compare performance, as a high energy conversion efficiency is indicative of the ability of an electric machine to generate large motional forces while generating limited radial forces.

The electromagnetic forces generated by an electric machine can be viewed as the product of interaction between normal and tangential components of the magnetic flux density. Thus, flux distribution plays a very important role in force generation. The double stator switched reluctance apparatus has an alternative structural configuration or geometry, which yields a flux distribution very different from that of a conventional switched reluctance machine. This different flux distribution provides a more productive force profile than that of a conventional switched reluctance machine.

Two key aspects of the different flux distribution of the double stator switched reluctance apparatus are as follows. First, in operation of the double stator switched reluctance apparatus a short flux path may be created and maintained at all times. In particular, the portions of the stators not participating in energy conversion are not magnetized, so that energy is not diverted to this end. In addition, eddy currents are thus not produced in the portions of the stators not participating in energy conversion, thus reducing core losses. Second, in operation of the double stator switched reluctance apparatus the amount of flux entering the corner tips and the side surfaces (parallel to the radius of the rotor) of the rotor segments in a direction of motion is greatly increased while the amount of flux entering the top and bottom surfaces (perpendicular to the radius of the rotor) of the rotor segments in a direction perpendicular to the direction of motion is greatly decreased. This relative increase in flux in the direction of motion, including in particular the fringing flux (i.e., flux entering the corner tips of the rotor segments), greatly increases the motional force produced. In addition, the reduction in force generated perpendicular to the direction of motion reduces acoustic noise.

The double stator configuration and the rotor geometry comprising a shell type rotor having non-projecting rotor segments, whereby two electromagnets are placed on either side of the rotor segment with a narrow air gap therebetween, are understood to be key factors responsible for the short flux path and the increased flux in the direction of motion. The shell type rotor also results in reduced inertia.

Other advantages of the switched reluctance apparatus include fault tolerance, extended speed range capability, modular configuration, ability to operate without a position sensor, and ability to operate in harsh ambient conditions.

A switched reluctance apparatus according to embodiments of the present invention will now be described in further detail, first, as to the structure thereof, and second, as to the operation thereof. Still further detail in this regard may be found in the article, "Double-Stator Switched Reluctance Machine (DSSRM): Fundamentals and Magnetic Force Analysis," *IEEE Transactions on Energy Conversion*, Volume 25, Issue 3, September 2010, by the inventors of the instant application, which is included in U.S. provisional patent application No. 61/358,583, to which the instant application claims priority and which is incorporated herein by reference, as noted above. Reference is at times made in the instant application to what are understood to be reasons underlying improved performance of the present invention vis ávis the prior art. While statements of such reasons represent the inventors' beliefs based on scientific research, the inventors nonetheless do not wish to be bound to theory.

Figure 2:
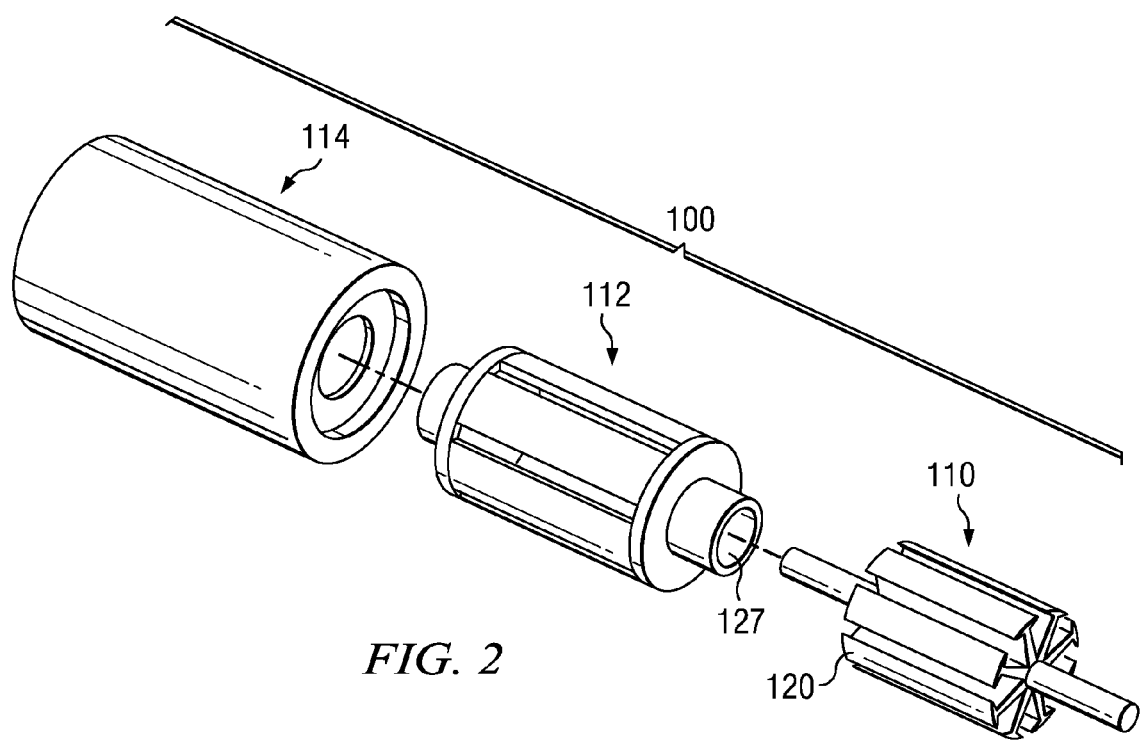
FIG. 2 is an exploded view showing parts of a switched reluctance apparatus, including an inner stator, a rotor, and an outer stator, in accordance with some embodiments of the present invention.
Figure 3:
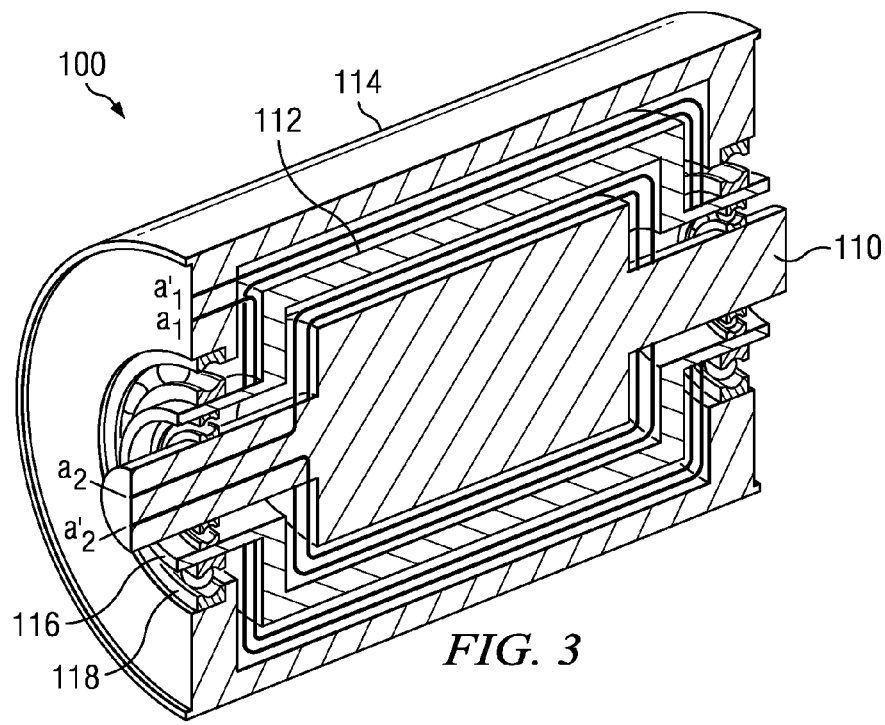
FIG. 3 is a partial cutaway view of a switched reluctance apparatus, in accordance with some embodiments of the present invention.
Figure 4:
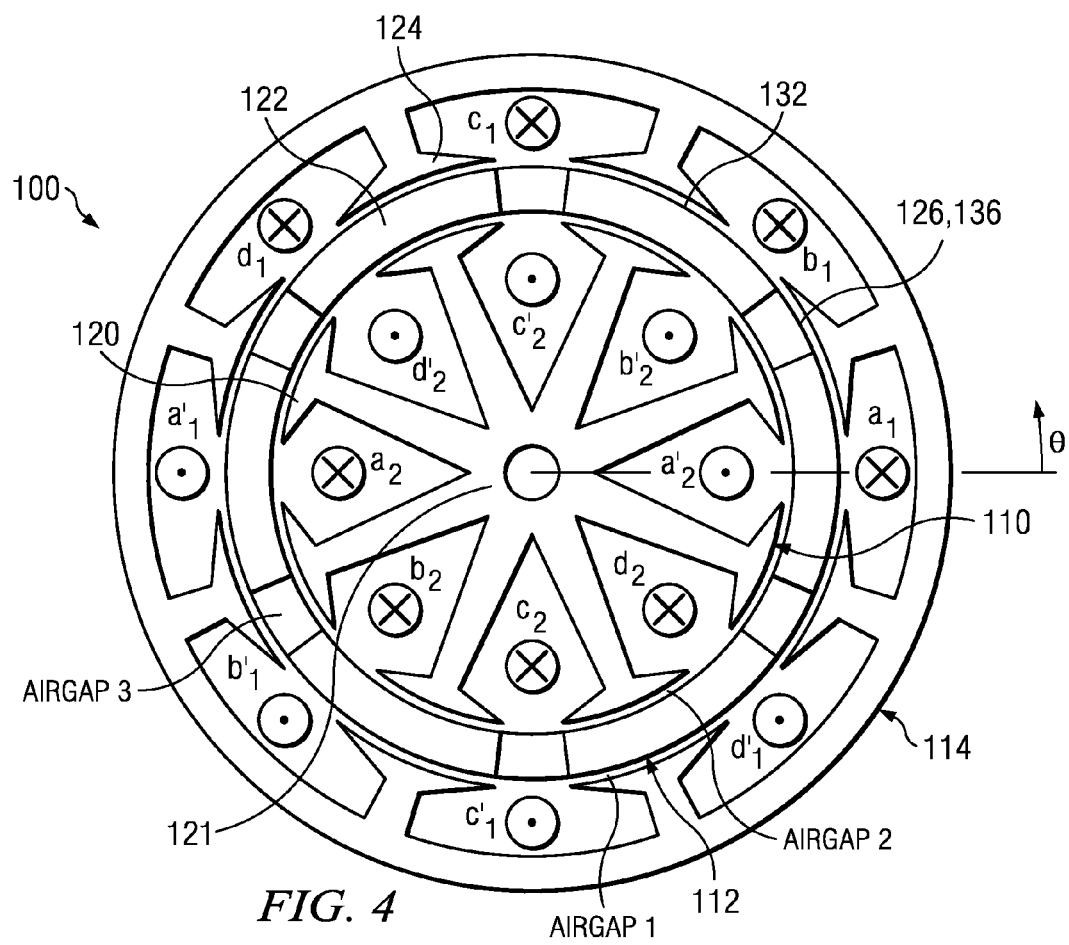
FIG. 4 is a cross-sectional view of a switched reluctance apparatus having an 8/6/8 configuration, in accordance with some embodiments of the present invention.
Figure 5:
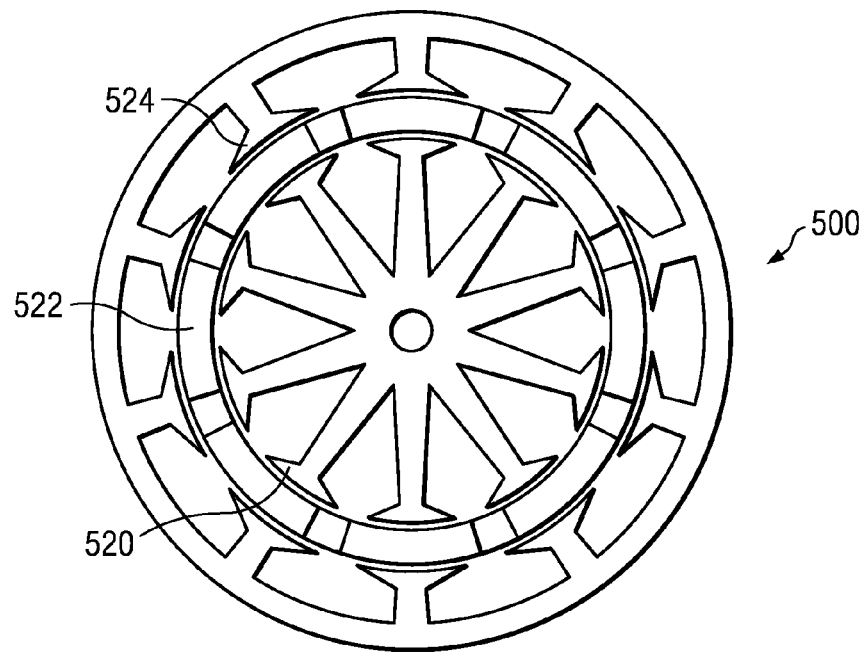
FIG. 5 is a cross-sectional view of a switched reluctance apparatus having a 10/8/10 configuration, in accordance with some other embodiments of the present invention.

The structure of a switched reluctance apparatus according to some embodiments of the present invention will be described with reference to FIGS. 1-5. FIG. 1 is a perspective view showing parts of a disassembled switched reluctance apparatus, including an inner stator, a rotor, and an outer stator, in accordance with some embodiments of the present invention. FIG. 2 is an exploded view showing the same three components of a switched reluctance apparatus, in accordance with some embodiments of the present invention. FIG. 3 is a partial cutaway view of a switched reluctance apparatus, in accordance with some embodiments of the present invention. FIG. 4 is a cross-sectional view of a switched reluctance apparatus having an 8/6/8 configuration, in accordance with some embodiments of the present invention. FIG. 5 is a cross-sectional view of a switched reluctance apparatus having a 10/8/10 configuration, in accordance with some other embodiments of the present invention.

Turning now to FIGS. 1-4, switched reluctance apparatus 100 includes three primary components, namely, inner stator 110, rotor 112, and outer stator 114. Each of inner stator 110, rotor 112, and outer stator 114 may be cylindrical in shape. Inner stator 110 is disposed at the radial center of switched reluctance apparatus 100, rotor 112 is disposed radially outward of inner stator 110, and outer stator 114 is disposed radially outward of rotor 112. Each of inner stator 110, rotor 112, and outer stator 114 are concentric, having the same cylindrical axis, which may also be deemed the cylindrical axis of switched reluctance apparatus 100. As seen most easily in FIG. 3, inner stator 110 may be connected to rotor 112 by a pair of ball bearings 116, one ball bearing 116 being disposed at each axial end of switched reluctance apparatus 100. Likewise, rotor 112 may be connected to outer stator 114 by a pair of ball bearings 118 each having a larger circumference than that of each of ball bearings 116, one ball bearing 118 being disposed at each axial end of switched reluctance apparatus 100. Thus, rotor 112 is connected to inner stator 110 and outer stator 114 in such a fashion as to permit rotor 112 to rotate relative to inner stator 110 and outer stator 114, while inner stator 110 and outer stator 114 remain stationary.

Although not shown in the illustrated embodiments, a switched reluctance apparatus according to other embodiments of the invention may be provided with additional rotor-stator radial layers, that is, additional pairs of rotor and stator may be added on to the above-described stator-rotor-stator configuration in the radial direction.

Having a cylindrical axis, switched reluctance apparatus 100 may be described as having two opposed axial ends, one at either end of the cylindrical axis thereof. One such end (the left end in FIG. 3) of switched reluctance apparatus 100 may be used to house portions of wiring, which are selectively energized in operation of the apparatus, as described below. The other axial end (the right end in FIG. 3) of switched reluctance apparatus 100 may be adapted for connecting a load to rotor 112. Either axial end of switched reluctance apparatus 100 may be used for either of these functions.

As seen most easily in FIG. 4, inner stator 110 has a plurality of salient poles 120, projecting radially outward from back iron 121 of inner stator 110, back iron 121 being the radially inner portion of inner stator 110, located closest to the cylindrical axis thereof. Outer stator 114 has a plurality of salient poles 124, projecting radially inward from back iron 125 of outer stator 114, back iron 125 being the radially outer, circumferential portion of outer stator 114, located farthest from the cylindrical axis thereof. As seen, for example, in FIGS. 1, 2 and 4, rotor 112 may be described as a shell-type or drum rotor. Referring to FIGS. 1 and 4, rotor 112 includes a cylindrical cage 126 housing a plurality of segments 122 serving as poles. Segments 122 may be formed so as not to project radially outward or inward from cylindrical cage 126, and thus may be thought of as arcuate portions of cylindrical rotor 112. The radially outer surface 132 of each segment 122 may be flush or substantially flush with the radially outer surface 136 of cylindrical cage 126. Referring to FIG. 2, rotor 112 turns on a shaft 127 to rotate with respect to inner stator 110 and outer stator 114. Because of its form, rotor 112 is understood to be lighter than a rotor of a conventional switched reluctance machine. Accordingly, rotor 112 is understood to exhibit a low moment of inertia and a fast response time.

Each of inner stator 110, outer stator 114 and rotor segments 122 may be formed of a soft ferromagnetic material. Each of inner stator 110, outer stator 114 and rotor segments 122 may be formed of the same soft ferromagnetic material, but this is not required. In particular, inner stator 110, outer stator 114 and rotor segments 122 may be formed of silicon steel and, more preferably, of M-19, although silicon steel of other grades or M-numbers, for example, up to M-49, may be employed. This description of materials is not to be taken as limiting. The grade or M-number indicates a maximum core loss, with higher M-numbers indicating higher maximum core losses. Though not required, it is preferable for the material forming inner stator 110, outer stator 114 and rotor segments 122 to be laminated. Lamination serves to reduce losses due to eddy currents.

Each of inner stator poles 120, outer stator poles 124, and rotor segments 122 may be formed as a portion extended in the direction of the cylindrical axis. In this regard, it should be noted that the terms "stack length" or "axial length," used with reference to the cylindrical axis of switched reluctance apparatus 100, inner stator 110, rotor 112, or outer stator 114, refer herein to the length of the portion of the apparatus 100, stator 110 or 114, or rotor 112 that participates in electromechanical energy conversion, not the entire length of apparatus 100, stator 110 or 114, or rotor 112. The term "length" will be used to refer to the entire length of apparatus 100, stator 110 or 114, or rotor 112. Referring to FIGS. 1 and 2, each of inner stator poles 120, outer stator poles 124 (not clearly visible in FIGS. 1 and 2), and rotor segments 122 may be formed as a single portion extending along the entire stack length of apparatus 100. Thus, the respective cross-sections of inner stator poles 120, outer stator poles 124 and rotor segments 122 shown in FIGS. 4 and 5 remain the same throughout the respective stack lengths of inner stator 110, outer stator 114 and rotor 112. The stack lengths of apparatus 100, stators 110 and 114, and rotor 112 may extend most of the lengths of apparatus 100, stators 110 and 114, and rotor 112, respectively.

The aspects of embodiments of the invention discussed below are illustrated, for example, by FIGS. 4 and 5. The number of inner stator poles 120 is the same as the number of outer stator poles 124. The number of rotor segments 122 is preferably different from the number of poles of either stator, as this precludes the possibility of all the rotor segments 122 aligning with all of the stator poles 120 and 124, in which position no torque can be generated. Further description of stator and rotor configurations, as to numbers of poles and segments, is given below.

The number of inner stator poles 120 is an even number, and inner stator poles 120 are spaced at equal angular intervals about the cylindrical axis of inner stator 110 or, put another way, the radially outer/inner ends of inner stator poles 120 are equally spaced about the outer circumference/back iron 121 of inner stator 110. The number of rotor segments 122 is an even number, and rotor segments 122 are spaced at equal angular intervals about the cylindrical axis of rotor 112 or, put another way, the radially outer ends of rotor segments 122 are equally spaced about the outer circumference of rotor 112. The number of outer stator poles 124 is an even number, and outer stator poles 124 are spaced at equal angular intervals about the cylindrical axis of outer stator 114 or, put another way, the radially outer/inner ends of outer stator poles 124 are equally spaced about the back iron 125/inner circumference of outer stator 114. Given that the number of poles of either stator is even and that the poles of either stator are spaced at equal angular or circumferential intervals, it follows that for any given pole of a given stator there will be another pole of the given stator at a position diametrically opposed to the given pole. That is, if a given pole of a given stator is positioned at, for example, 0 degrees, another pole of the given stator will be positioned at 180 degrees.

Not only are inner stator poles 120 and outer stator poles 124 equal in number and are both sets of stator poles 120 and 124 respectively spaced at equal angular positions about the cylindrical axis, but also the two sets of stator poles 120 and 124 are respectively positioned at the same angular positions with respect to the cylindrical axis. For example, if inner stator poles 120 are positioned at 0, 45, 90, 135, 180, 225, 270, 315 and 360 degrees, so too are outer stator poles 124 positioned at 0, 45, 90, 135, 180, 225, 270, 315 and 360 degrees. Accordingly, there is a one-to-one correspondence between inner stator poles 120 and outer stator poles 124. For any given pole of one stator, there is a corresponding pole of the other stator, the two poles being located at the same angular position. Such two poles may be referred to herein as corresponding poles, and their respective angular positions may be referred to herein as corresponding (angular) positions.

As will be appreciated by one of ordinary skill in the art, switched reluctance apparatus 100 may have any of various configurations as to numbers of stator poles and rotor segments. As non-limiting examples, switched reluctance apparatus 100 may have any of the following configurations: 6/4/6, 8/6/8, 10/8/10, 12/8/12 and 16/12/16, where the first number indicates the number of poles per outer stator, the second number indicates the number of rotor segments, and the third number indicates the number of poles per inner stator. FIG. 4 illustrates an 8/6/8 configuration, in which switched reluctance apparatus 100 has eight outer stator poles 124, six rotor segments 122, and eight inner stator poles 120, while FIG. 5 illustrates a 10/8/10 configuration, in which switched reluctance apparatus 500 has ten outer stator poles 524, eight rotor segments 522, and ten inner stator poles 520. Despite the stated and illustrated examples, switched reluctance apparatus 100 may have a configuration in which the number of rotor segments exceeds the number of poles of either stator. A greater number of poles may be preferred for operation of a switched reluctance apparatus at lower speeds, while a smaller number of poles may be preferred for operation of a switched reluctance apparatus at higher speeds.

As seen, for example, in FIG. 4, airgaps exist between stator poles 120 and 124 and rotor segments 122. Specifically, a narrow airgap 1 exists between outer stator poles 124 and rotor segments 122, a narrow airgap 2 exists between inner stator poles 120 and rotor segments 122, and a relatively large airgap 3 exists between each pair of adjacent rotor segments 122. Airgaps 1 and 2 permit rotation of rotor segments 122 between inner stator poles 120 and outer stator poles 124. Airgaps 1 and 2 may have a radial extent of 1.0 mm. In other words, the radial distance between outer stator poles 124 and rotor segments 122, and the radial distance between inner stator poles 120 and rotor segments 122, may be 1.0 mm. The radial extent of airgaps 1 and 2 is not required to be 1.0 mm.

Between each pair of adjacent inner stator poles 120, and between each pair of adjacent outer stator poles 124, a respective winding is disposed, parallel to rotor shaft 127 and the cylindrical axis. Thus, as seen in FIG. 4, windings a1, b1, c1, d1, a', b1', c1' and d1' are disposed in counterclockwise sequence (starting at 3 o'clock in the figure) between successive pairs of outer stator poles 124, respectively, and windings a2, b2, c2, d2, a2', b2', c2' and d2' are disposed in counterclockwise sequence (starting at 9 o'clock in the figure) between successive pairs of inner stator poles 120, respectively. The illustrated arrow heads and arrow tails indicate the direction of current flow through the windings when current is made to flow through the windings, during operation of switched reluctance apparatus 100, which is explained below. Rotor 112 does not have any windings.

The operation of a switched reluctance apparatus according to some embodiments of the present invention, with some further description of the structure thereof, will be described with additional reference to FIGS. 6-13. According to embodiments of the present invention, there are provided switched reluctance apparatuses configured to operate with three or more separately excitable phases. FIG. 4 shows switched reluctance apparatus 100, which is configured to operate with four separately excitable phases, while FIG. 5 shows switched reluctance apparatus 500, which is configured to operate with five separately excitable phases.

Referring to FIG. 4, the four phases of switched reluctance apparatus 100 are designated as "a," "b," "c," and "d." Each phase corresponds to four windings, four inner stator poles, and four outer stator poles. For example, phase "a" corresponds to windings a1, a1', a2, and a2', the pair of inner stator poles 120 between which winding a2 is disposed, the pair of inner stator poles 120 between which winding a2' is disposed, the pair of outer stator poles 124 between which winding a1 is disposed, and the pair of outer stator poles 124 between which winding a1' is disposed. As seen in FIG. 4, the pair of inner stator poles 120 between which winding a2 is disposed is diametrically opposed to the pair of inner stator poles 120 between which winding a2' is disposed, and the pair of outer stator poles 124 between which winding a1 is disposed is diametrically opposed to the pair of outer stator poles 124 between which winding a1' is disposed. In addition, the pair of inner stator poles 120 between which winding a2 is disposed corresponds to the pair of outer stator poles 124 between which winding a1' is disposed, and the pair of inner stator poles 120 between which winding a2' is disposed corresponds to the pair of outer stator poles 124 between which winding a1 is disposed. As noted above, correspondence between a pole 120 of inner stator 110 and a pole 124 of outer stator 114 means that the two poles are located at the same, or corresponding, angular positions on inner stator 110 and outer stator 114, respectively.

Likewise, phase "b" corresponds to windings b1, b1', b2, and b2', the pair of inner stator poles 120 between which winding b2 is disposed, the pair of inner stator poles 120 diametrically opposed thereto (i.e., between which winding b2' is disposed), the pair of outer stator poles 124 corresponding to the pair of inner stator poles 120 between which winding b2 is disposed (i.e., between which winding b1' is disposed), and the pair of outer stator poles 124 diametrically opposed to the pair of outer stator poles 124 corresponding to the pair of inner stator poles 120 between which winding b2 is disposed (i.e., between which winding b1 is disposed). The poles and windings corresponding to phases "c" and "d" are identified in like fashion.

The windings corresponding to each phase may be connected in series. That is, a1, a1', a2 and a2' may be connected in series, b1, b1', b2 and b2' may be connected in series, and likewise for the phase "c" windings and the phase "d" windings. In addition, the windings corresponding to a given phase are electrically isolated from the other windings. That is, a1, a1', a2 and a2' are electrically isolated from the windings of phases "b," "c" and "d," b1, b1', b2 and b2' are electrically isolated from the windings of phases "a," "c" and "d," and so on.

The basic principle of operation of a switched reluctance apparatus is that electromagnetic torque is generated by the tendency of the magnetic circuit to realize the configuration of minimum magnetic reluctance (resistance). A general explanation will be given followed by an illustrated example. When a given phase is excited by causing a current to flow through the windings of that phase, the rotor segments (two diametrically opposed segments) nearest the energized windings are attracted thereto, and thus align themselves respectively with the pairs of stator poles between which the windings are disposed. In this so-called aligned position, the reluctance is at a minimum. Since the number of rotor segments is not equal to the number of poles of either stator, when the two diametrically opposed rotor segments are aligned with pairs of stator poles, another two diametrically opposed rotor segments will be in so-called unaligned position. Exciting the phase adjacent to the unaligned rotor segments will cause those rotor segments to align themselves respectively with the pairs of stator poles of that phase, since reluctance is at a maximum in the unaligned position. By successively exciting adjacent phases, the rotor is caused to rotate while generating torque. The successive exciting of different phases involves the switching of current into different stator windings as reluctance varies, hence the name switched reluctance apparatus. It may be noted that when reluctance is at a minimum, inductance is at a maximum, and vice versa.

Figure 6:
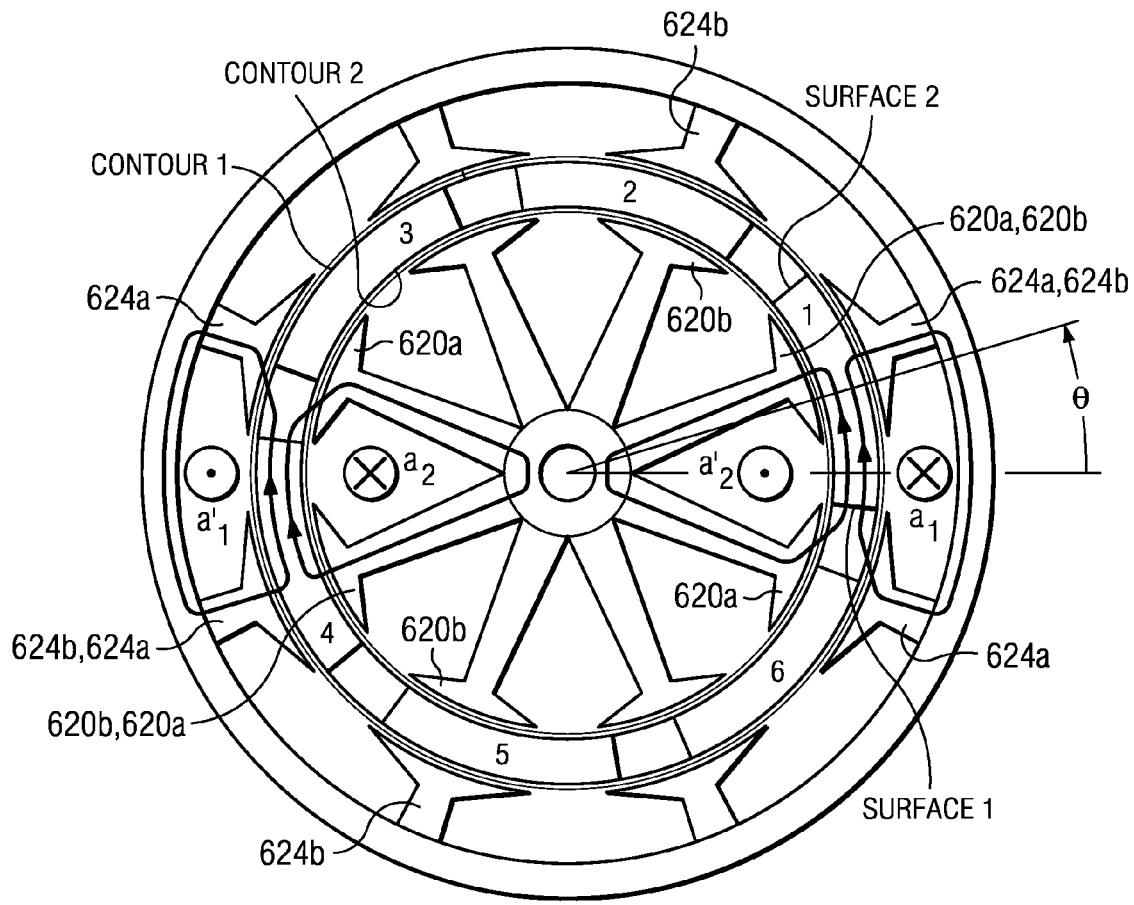
FIG. 6 is the cross-sectional view of the switched reluctance apparatus shown in FIG. 4, additionally illustrating magnetic flux paths induced when the rotor is at half-aligned position (θ=15°) and phase "a" is excited, in which circumstances the rotor tends to move clockwise, in accordance with some embodiments of the present invention.
Figure 10:
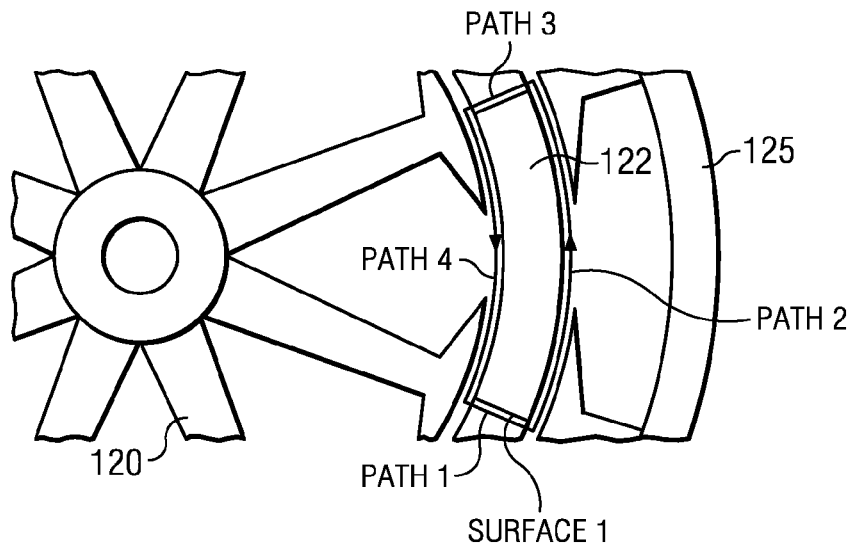
FIG. 10 is a fragmentary cross-sectional view of a switched reluctance apparatus, in accordance with some embodiments of the present invention.

As an example, referring to FIG. 6, when phase "a" is excited as shown therein, segments 4 and 1 will be pulled into alignment with the pairs of stator poles 620a, 624a of phase "a," that is, segments 4 and 1 will rotate clockwise. This position in which segments 4 and 1 have become aligned is shown in FIGS. 4 and 10. Next, phase "b" is excited, pulling segments 5 and 2 clockwise into alignment with the pairs of stator poles 620b, 624b of phase "b." Note that, at the time that excitation of phase "b" is begun, segments 5 and 2 will be in the position shown in FIG. 4 (in which segments 4 and 1 are aligned), not the position shown in FIG. 6. By continuing to excite each adjacent phase in counterclockwise succession, rotor 112 is made to rotate in the clockwise direction. Exciting adjacent phases in a clockwise succession will cause rotor 112 to rotate counterclockwise.

In the sequential or successive excitation of phases, a given phase may be excited when the rotor segments 122 (two diametrically opposed segments 122) nearest the windings to be energized (and to be rotated toward the windings to be energized) are in an unaligned position or shortly thereafter, and the given phase may then be unexcited, i.e., the windings corresponding to the phase may be deenergized, just before the rotor segments 122 align with the stator poles 120, 124 corresponding to the phase. It may be desirable to avoid permitting rotor segments 122 to reach alignment with the energized stator poles 120, 124, in order to avoid generating negative torque.

The above description pertains to operating switched reluctance apparatus 100 as a motor, in which case positive torque is to be generated. Switched reluctance apparatus 100 may also be operated as a generator, in which case negative torque is to be generated. When operated as a generator, a given phase is excited when the rotor segments 122 (two diametrically opposed segments 122) nearest the windings to be energized are in an aligned position or shortly thereafter, and the given phase may then be unexcited, i.e., the windings corresponding to the phase may be deenergized, just before the rotor segments 122 reach a fully unaligned position relative to the stator poles 120, 124 corresponding to the given phase.

Figure 13:
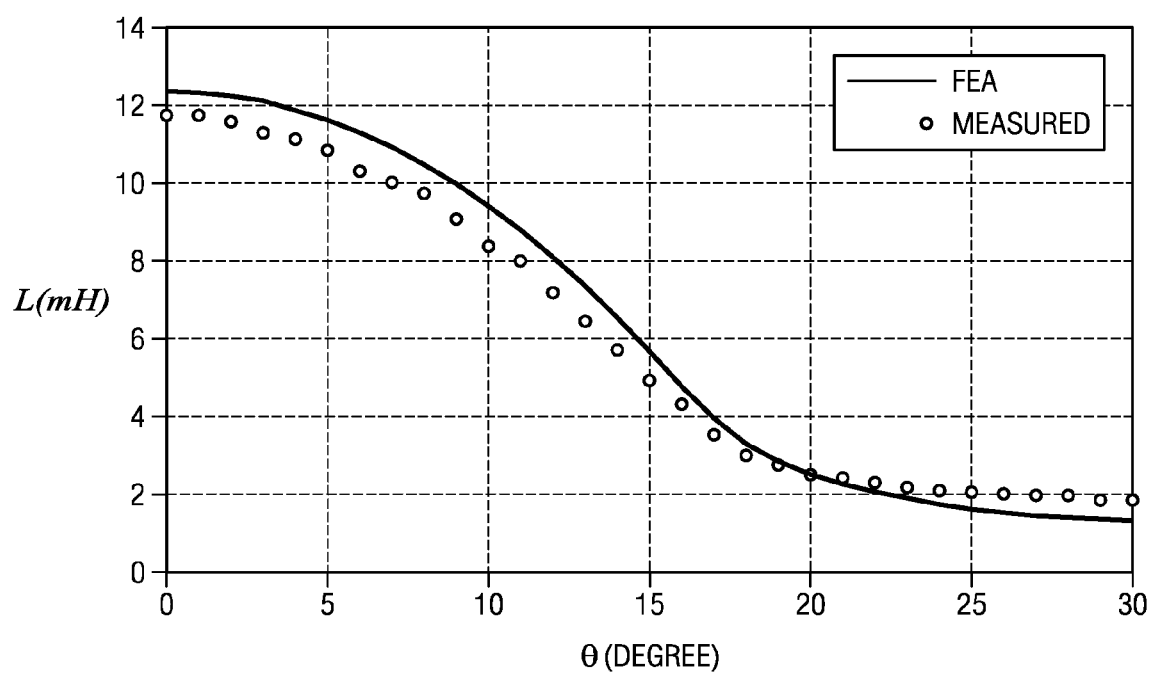
FIG. 13 is a graph illustrating measured and theoretical values of inductance of a switched reluctance apparatus, in accordance with some embodiments of the present invention.

As will be appreciated by one of ordinary skill in the art, inductance, L, varies periodically with rotor position, θ, (shown in FIG. 6) a given period having one interval in which L increases and one interval in which L decreases. An example of this relationship is shown in FIG. 13, although that figure shows only the latter interval and that figure illustrates the static case (i.e., rotor 112 is locked in various specific positions), as against during operation of switched reluctance apparatus 100. Inductance and FIG. 13 are further described below. In any event, exciting a given phase during a region of rising inductance produces a motoring (positive) torque, while exciting a given phase during a region of decreasing inductance produces a generating (negative) torque. For switched reluctance apparatus 100, θ=0° is defined as the aligned position, θ=15° is defined as the half-aligned position, and θ=30° is defined as the unaligned position.

FIG. 5 is a cross-sectional view of a switched reluctance apparatus having a 10/8/10 configuration, in accordance with some other embodiments of the present invention. Five-phase switched reluctance apparatus 500 is operated in a manner analogous to that of four-phase switched reluctance apparatus 100.

Figure 7:
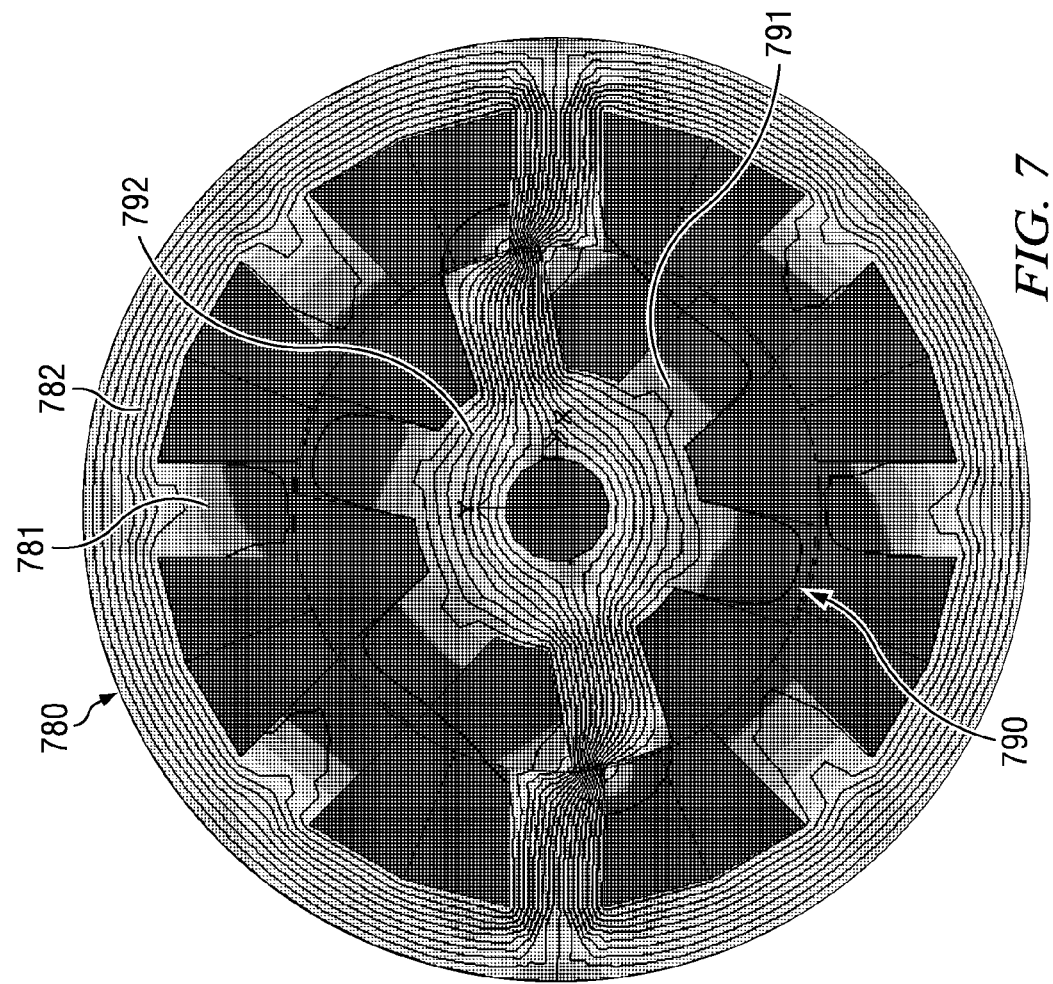
FIG. 7 is a cross-sectional view of a switched reluctance machine, illustrating lines of magnetic flux generated during operation thereof, in accordance with the prior art.
Figure 8A:
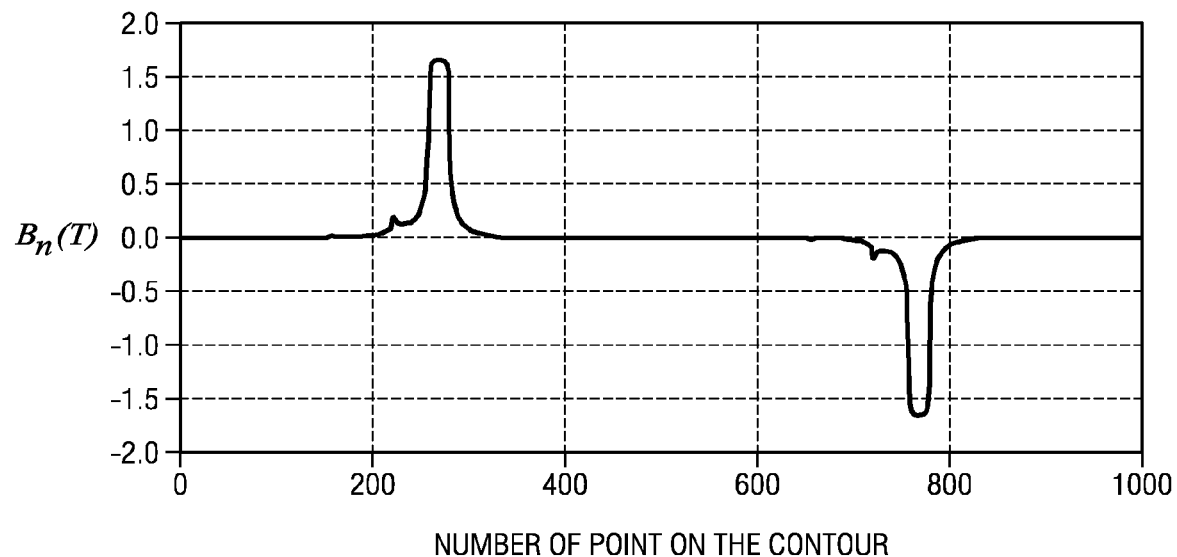
FIGS. 8A-8D are graphs illustrating the normal component of magnetic flux density, the tangential component of magnetic flux density, the normal component of force density, and the tangential component of force density, respectively, along a circular contour in the middle of an air gap of a switched reluctance machine, according to the prior art, when the rotor is at half-aligned position and the current is set to 20 amperes (20 A)
Figure 8B:
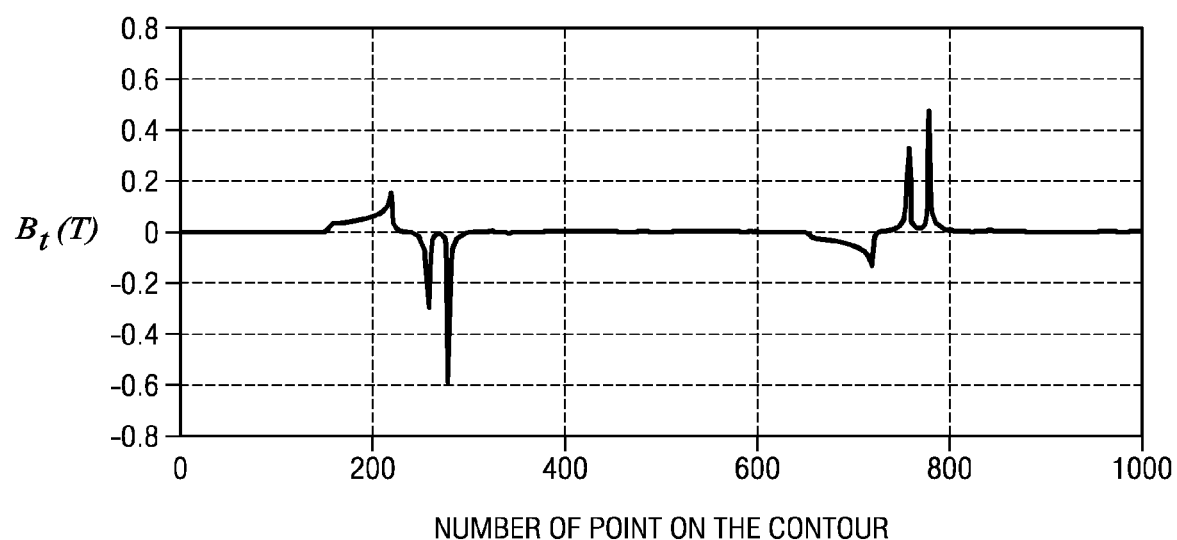
Figure 8C:
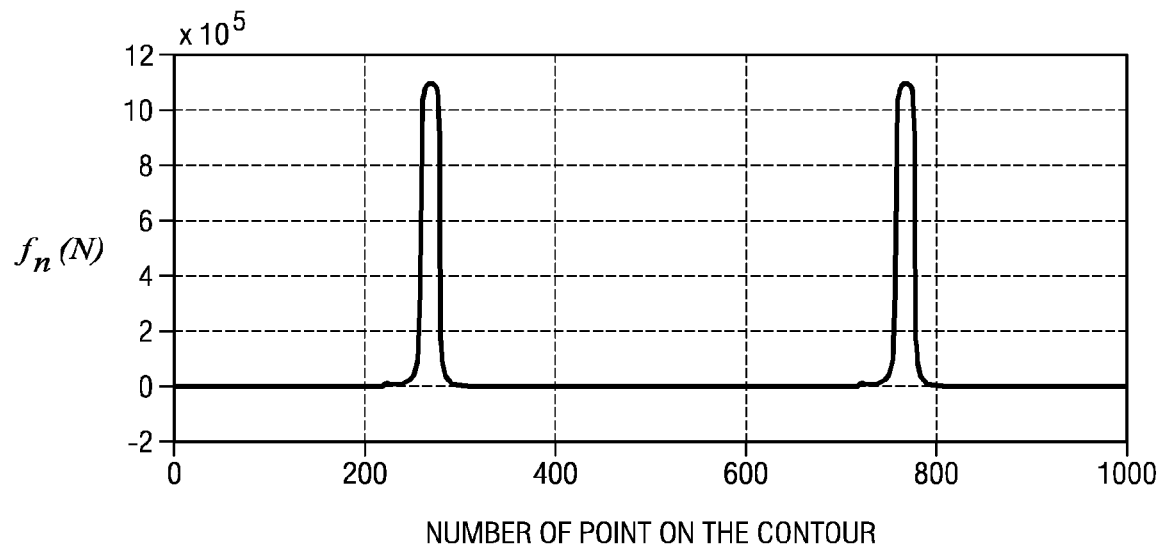
Figure 8D:
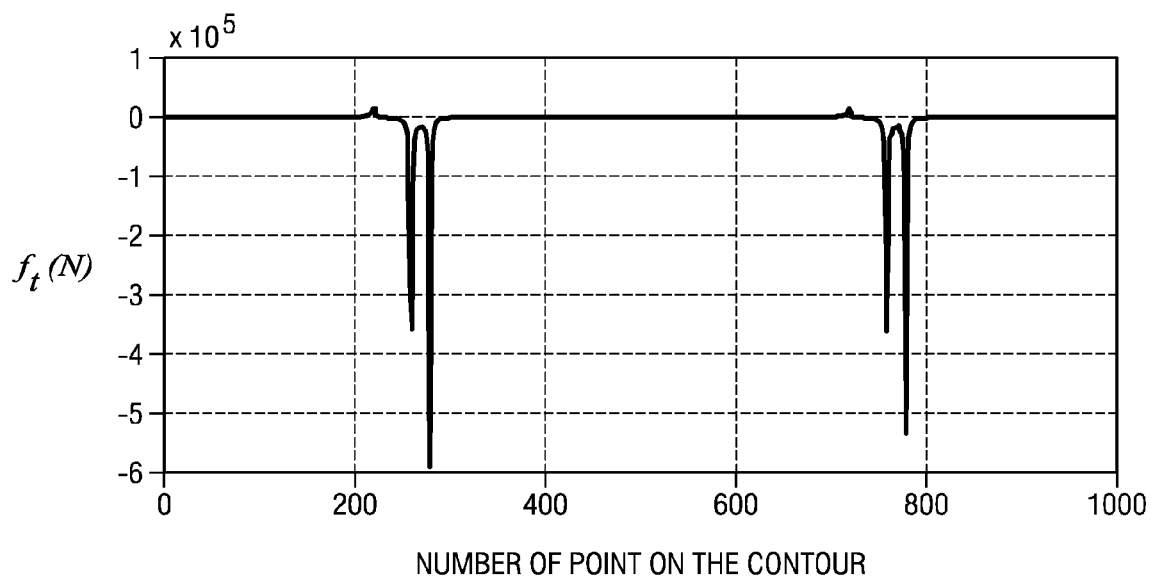

As noted, the geometry of switched reluctance apparatus 100, notably the double stator configuration and the rotor configuration including the non-ferromagnetic cylindrical cage and the geometry of the rotor segments, produces significant beneficial effects on the flux distribution. One such effect is that magnetic flux paths generated by excitation of the phases are short, as compared to a conventional switched reluctance machine. FIG. 7 illustrates a conventional switched reluctance machine 700, having a single stator 780 and a single rotor 790 disposed radially inward of stator 780. Conventional switched reluctance machine 700 has an 8/6 configuration, with stator 780 having eight salient poles 781 equally spaced about stator back iron 782 and rotor 790 having six salient poles 791 equally spaced about rotor back iron 792. In the figure, the phase corresponding to the stator poles 781 located at 3 o'clock and 9 o'clock is excited. As is clear from the figure, the lines of induced magnetic flux traverse not only the energized stator poles 781 and the rotor poles 791 tending toward alignment therewith, but also the entire stator back iron 782 and the entire rotor back iron 792. Much of the magnetized portions of stator 780 and rotor 790 does not contribute to useful work. In addition, core losses are high due, e.g., to eddy currents produced in portions of stator 780 and rotor 790 not participating in energy conversion.

In contrast to conventional switched reluctance machine 700, operation of switched reluctance apparatus 100 produces very short magnetic flux paths, which yield significantly improved energy conversion efficiency relative to conventional switched reluctance machine 700. Specifically, when a given phase of switched reluctance apparatus 100 is excited, the magnetic flux paths induced are substantially confined to the region of the stators 110, 114 and rotor 112 corresponding to the given phase. More particularly, as illustrated in FIG. 6, when a given phase of switched reluctance apparatus 100 is excited, the induced magnetic flux paths, as shown by the arrows in the figure, traverse the energized inner and outer stator poles 120, 124 (i.e., the stator pole pairs surrounding the energized windings, respectively), the portions of inner and outer stator back irons 121, 125 located between each energized pair of poles 120, 124, portions of rotor segments 122 located nearest the energized windings (and to be rotated toward the energized windings), and portions of airgaps 1, 2 and 3 located between adjacent ones of the indicated rotor segments 122 and poles 120, 124, but the induced magnetic flux paths do not traverse other regions of switched reluctance apparatus 100. (The portions of airgaps 1, 2 and 3 may be referred to generically as air gaps.) The poles 120, 124, segments 122, and airgaps 1, 2 and 3 indicated as being traversed by the magnetic flux paths induced by excitation of a given phase may be said to correspond to the given phase. Again, as seen in FIG. 6, each energized winding a1, a1', a2, and a2' induces a magnetic flux along the one of the four illustrated paths surrounding the respective winding. As further seen in the figure, when a given phase of switched reluctance apparatus 100 is excited, the induced magnetic fluxes traverse paths collectively encompassing approximately only one quarter (twenty-five percent) of each of inner and outer stators 110, 114. In terms of stator poles 120, 124, the magnetic fluxes induced by excitation of a given phase traverse paths collectively encompassing only four poles 120 of inner stator 110 (specifically, two diametrically opposed pairs of adjacent poles 120, such as the four poles 620a) and only four poles 124 of outer stator 114 (specifically, two diametrically opposed pairs of adjacent poles 124, such as the four poles 624a). Each of these diametrically opposed pairs of adjacent poles 120, 124 surrounds a respective energized winding. The described and illustrated short flux paths may be maintained at all times during operation of switched reluctance apparatus 100. As mentioned, the short flux paths reduce eddy currents and the core losses associated with them, and avoid expending energy on magnetizing large portions of stators 110, 114 and rotor 112 that do not participate in energy conversion.

Another beneficial effect of the geometry of switched reluctance apparatus 100 is the increased proportion of force in the direction of motion, due to the distribution of flux over the geometrical configuration of switched reluctance apparatus 100. This is seen from a comparison of flux and force densities between switched reluctance apparatus 100 and conventional switched reluctance machine 700. FIGS. 8A-8D show the flux and force densities calculated using a finite element model at 1000 equidistant points located on a circular contour in the middle of the air gap for the conventional switched reluctance machine 700 when rotor 780 is at half-aligned position and the current is set at 20 A. In equations (1) and (2) below, $B_n$ is the normal component of the flux density, $B_t$ is the tangential component of the flux density, $f_n$ is the normal component of the force density, $f_t$ is the tangential component of the force density, and $\mu_0$ is the absolute permeability. The components of B and f are related as follows:

$$f_n = \frac{1}{2\mu_0}(B_n^2 - B_t^2) \quad (1)$$

$$f_t = \frac{1}{\mu_0}(B_n B_t) \quad (2)$$

As seen in FIGS. 8A-8D, the maxima of $B_t$ and $f_t$ appear at the respective corners tips of the rotor and stator. Notably, a large normal force exists at this rotor position that is substantially stronger than the tangential component. Magnetic force analysis shows that the majority of the force produced (normal force) is perpendicular to the direction of motion and does not lead to useful mechanical work. The component of the force that is in the direction of motion is much less than the component of force perpendicular to the direction of motion.

Let us consider now switched reluctance apparatus 100. FIGS. 9A-9D show the flux and force densities calculated using a finite element model at 1000 equidistant points located on a contour surrounding rotor segment 122 in the airgaps for switched reluctance apparatus 100 when rotor 112 is at half-aligned position (θ=15°) and the current is set to 10 A. The contour is made up of four paths, path 1, path 2, path 3, and path 4, as indicated on the x-axes of the graphs of FIGS. 9A-9D and illustrated in FIG. 10. Again, $B_n$ is the normal component of the flux density, $B_t$ is the tangential component of the flux density, $f_n$ is the normal component of the force density, and $f_t$ is the tangential component of the force density. It is noted FIGS. 9A-9D show specific values of $B_n$, $B_t$, $f_n$, and $f_t$ for specific values of current and rotor position, while the actual numerical values of these quantities will vary as rotor position varies and as current varies. Nonetheless, the illustrated profiles and relative values of normal and tangential components over the several paths are significant.

Figure 9A:
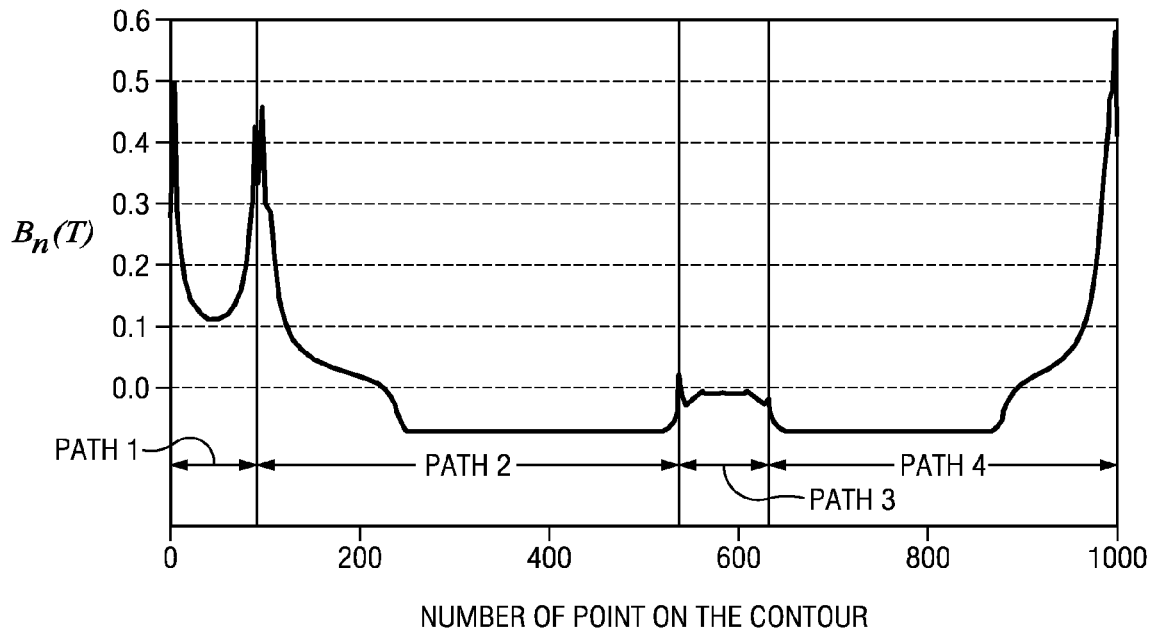
FIGS. 9A-9D are graphs illustrating the normal component of magnetic flux density, the tangential component of magnetic flux density, the normal component of force density, and the tangential component of force density, respectively, along a contour surrounding a rotor segment in airgaps for a switched reluctance apparatus, when the rotor is at half-aligned position (θ=15°) and the current is set to 10 amperes (10 A), in accordance with some embodiments of the present invention.
Figure 9B:
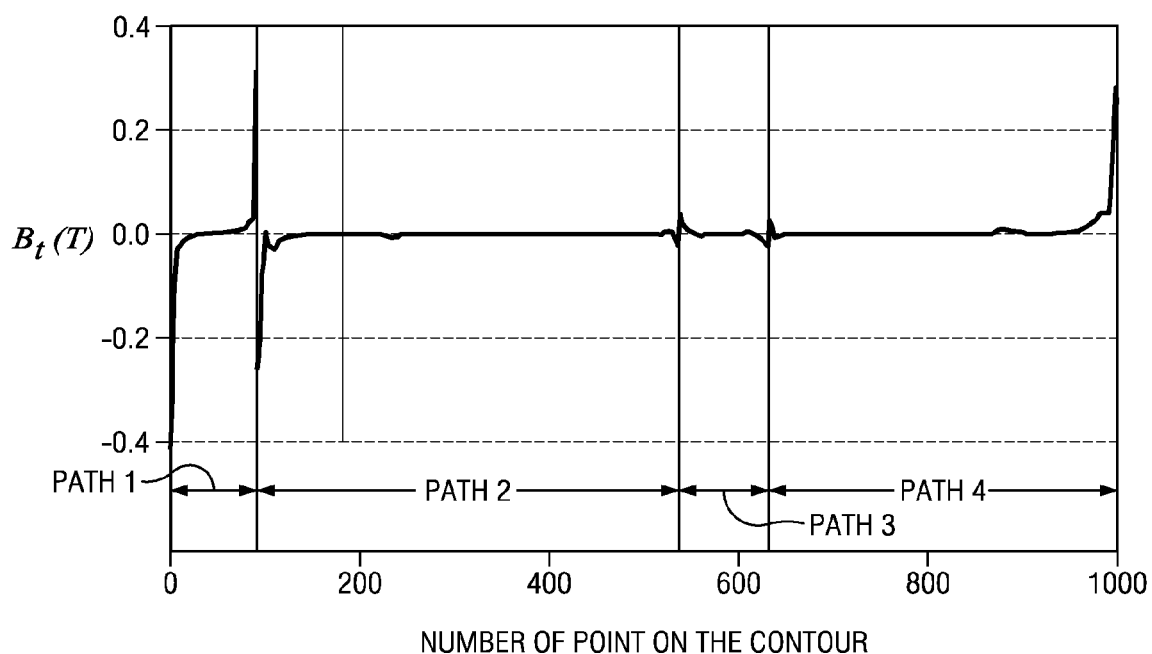
Figure 9C:
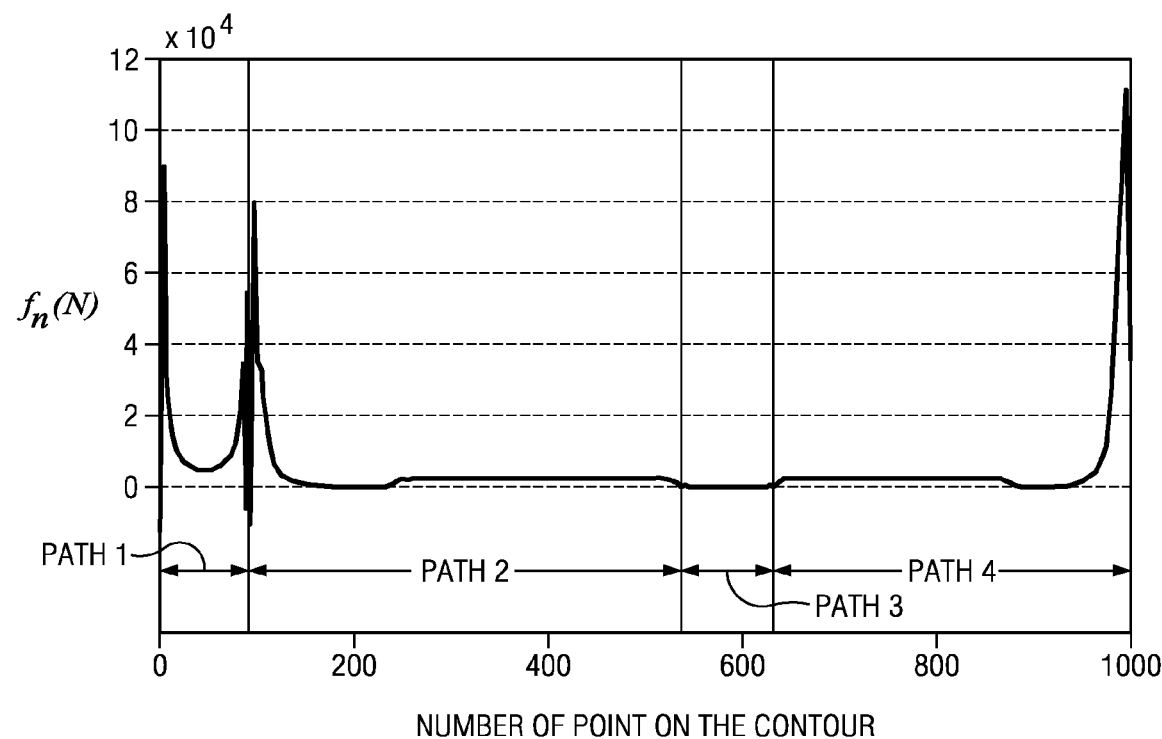
Figure 9D:
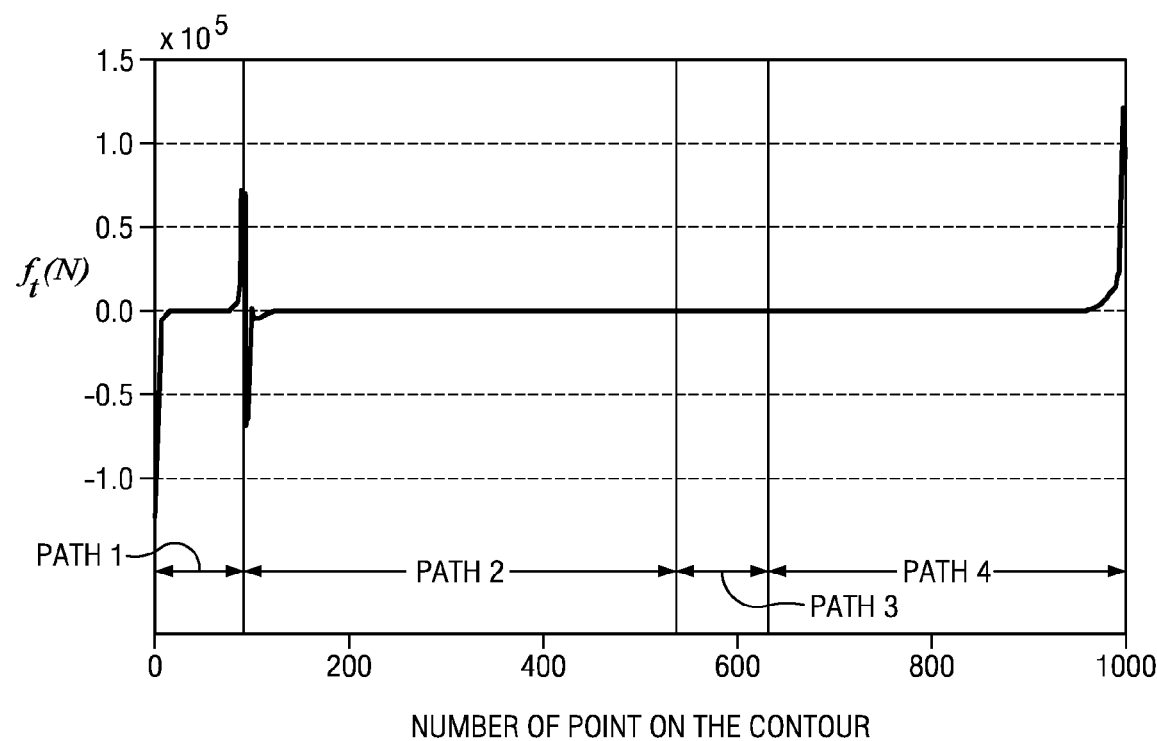

Referring to FIGS. 9A-9D, it is seen that $B_n$ has a positive value along the entirety of Path 1 and reaches peak values at the corners of the rotor segment. In addition, the peak value of $B_t$ occurs at the corners of the rotor segment, where saturation takes place. The structure is designed in such a way that a relatively large magnetic flux passes through the rotor segment along Path 1. Based on equations (1) and (2), the normal component of the force density, $f_n$, along Path 1, as compared to Paths 2, 3 and 4, should have a significant value, as shown in FIG. 9C. It is important to note that here $f_n$ is in the direction of motion and produces a large portion of the motional force. This means that in switched reluctance apparatus 100 the normal force plays a more useful role and produces more torque. On the other hand, the tangential component of the force density, $f_t$, along Path 1 is in the radial direction and averages to zero (FIG. 9D). This is due to the fact that $f_t$ exhibits an odd symmetry with respect to the midpoint of Path 1.

Along Path 2, the peak values of $B_n$ and $B_t$ occur at the saturated corners of the rotor segment. Along Path 2, $f_t$ is in the direction of motion and helps to produce torque, but $f_n$ is in the radial direction. Along Path 3, $B_n$ and $B_t$ are much smaller than along Path 1. Thus, they produce only a small torque in the direction opposite to the direction of motion. Along Path 4, $B_n$ and $B_t$ exhibit profiles symmetric to those along Path 2.

In sum, operation of switched reluctance apparatus 100 generates a relatively large number of flux lines that are perpendicular to the rotor segment surface along Path 1 (also referred to as Surface 1, in FIG. 6), before the rotor segment reaches a fully aligned position. Based on equations (1) and (2), the normal force that is produced on the rotor segment surface along Path 1 (Surface 1) is in the direction of motion and produces a large motional force. Compared to conventional switched reluctance machine 700, switched reluctance apparatus 100 generates a significantly larger motional force and a significantly smaller radial force, based on a greater amount of magnetic flux in the direction of motion, following from the geometry of apparatus 100 and how it directs the lines of flux through the structure. In this regard, the two electromagnets (stator poles 120, 124) on either side of the non-projecting rotor segment 122, with narrow air gaps therebetween, serve (i) to prevent a substantial amount of flux from entering the top and bottom surfaces (i.e., the surfaces along Paths 2 and 4, respectively) of the rotor segments in a radial direction, and (ii) to cause a substantial amount of flux to enter the side surfaces (i.e., the surfaces along Paths 1 and 3, identified as Surfaces 1 and 2, respectively, in FIG. 6) of the rotor segments, including corners where the side surfaces meet the top and bottom surfaces, in a direction perpendicular to the radial direction. The top and bottom surfaces of the rotor segments may also be referred to as surfaces facing the outer and inner stators, respectively, while the side surfaces of the rotor segments may also be referred to as surfaces facing an intersegmental air gap, i.e., an air gap (identified as airgap 3 in FIG. 4) between adjacent rotor segments.

Figure 11A:
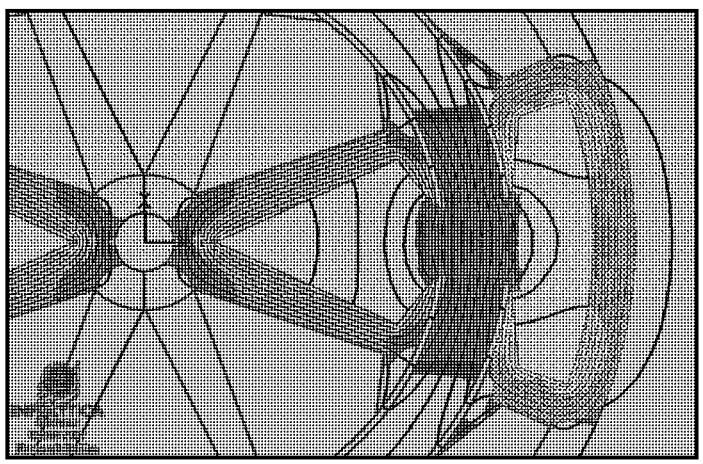
FIGS. 11A-11C are fragmentary cross-sectional views of a switched reluctance apparatus, showing a rotor segment in unaligned, half-aligned and aligned positions, respectively, and illustrating lines of magnetic flux generated during operation of the switched reluctance apparatus, in accordance with some embodiments of the present invention.
Figure 11A:
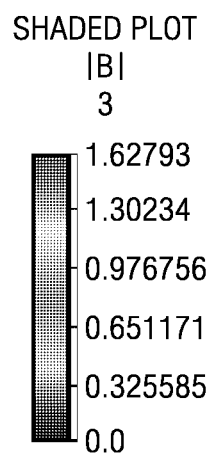
Figure 11B:
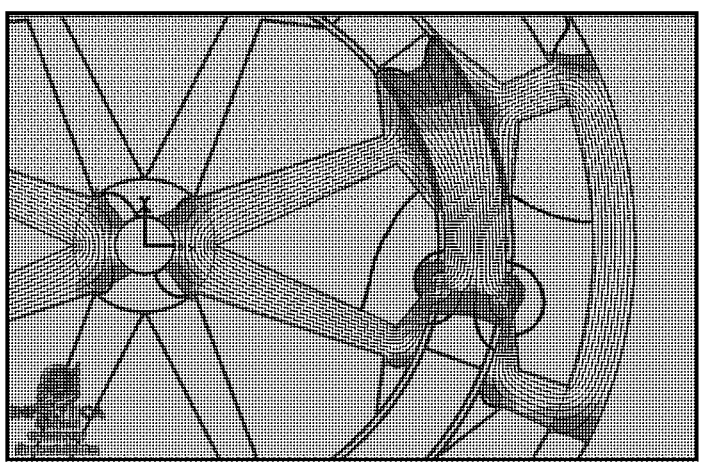
Figure 11B:
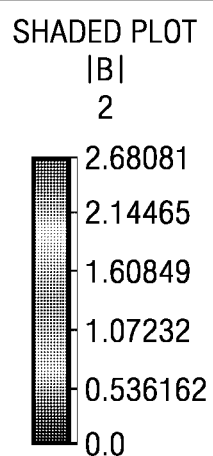
Figure 11C:
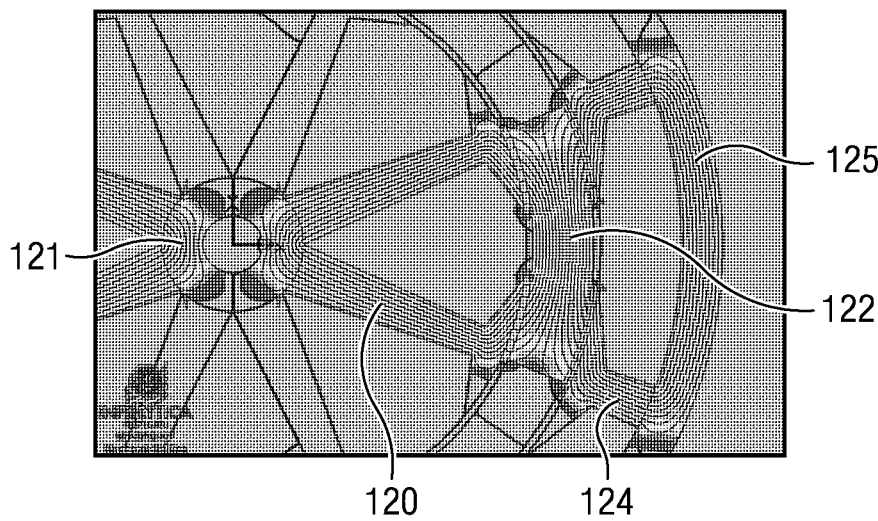
Figure 11C:
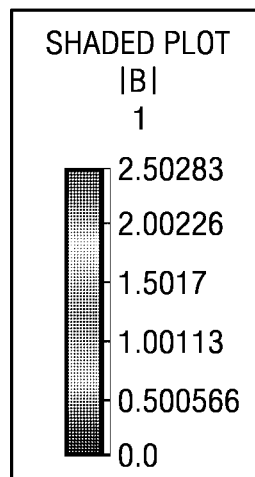

As a complement to the graphical representation of flux density shown in FIGS. 9A and 9B, FIGS. 11A-11C are fragmentary cross-sectional views of a switched reluctance apparatus 100, illustrating lines of magnetic flux generated during operation of the apparatus 100. Specifically, FIGS. 11A-11C illustrate part of a region of switched reluctance apparatus 100 corresponding to a given phase, and show lines of magnetic flux induced in the region when the given phase is excited. Each of FIGS. 11A-11C shows the flux induced in the excited region when rotor 112 is at one of three different positions, respectively: FIG. 11A illustrates the induced flux when rotor 112 is at the unaligned position (θ=30°); FIG. 11B, at the half-aligned position (θ=15°); and FIG. 11C, at the aligned position (θ=0°) (as noted, the aligned position is also shown in FIG. 10).

The improvement in relative proportions of motional and radial forces of switched reluctance apparatus 100 as compared to conventional switched reluctance machine 700 may be gauged by a quantity referred to as energy conversion efficiency, ECE, defined as follows:

$$ECE(\theta, i) = \frac{F_{Motional}(\theta, i)}{F_{Motional}(\theta, i) + F_{Radial}(\theta, i)} * 100 \qquad (3)$$

where $F_{Motional}$ is the net force which is generated in the direction of motion, $F_{Radial}$ is the total radial force (perpendicular to the direction of motion), θ is the rotor position and i is the phase current. A high ECE is thus indicative of the ability of an electric machine to generate large motional forces while generating limited radial forces.

In order to obtain radial and motional forces produced by switched reluctance apparatus 100, two different circular contours (Contour 1 and Contour 2, FIG. 6) are selected in the middle of Airgap 1 and Airgap 2 (see FIG. 4). Once the tangential and normal components of the force densities ($f_{t1}$, $f_{t1}$, $f_{n2}$, $f_{n2}$) are calculated at every position on the integration contours (Contour 1 and Contour 2), one may calculate the total radial force, $F_{Radial}$, using the following formula:

$$F_{Radial} = L_s \left( \int_0^{2\pi} (\vec{f}_{n1} \cdot \vec{n}) r_1 d\phi + \int_0^{2\pi} (\vec{f}_{n2} \cdot \vec{n}) r_2 d\phi \right) \qquad (4)$$

where $\vec{n}$ denotes the unit vector in the normal direction, and $r_1$, $r_2$ and $L_s$ are the radii of the integration contours (Contour 1 and Contour 2) and stack length, respectively. The net motional force, $F_{Motional}$, is obtained using the following equation:

$$F_{Motional} = L_s \left( \int_{c_1} \vec{f}_{t1} dl \cdot \vec{t} + \int_{c_2} \vec{f}_{t2} dl \cdot \vec{t} \right) \qquad (5)$$

where $\vec{t}$, $c_1$ and $c_2$ denote the unit vector in the tangential direction and the integration contours (Contour 1 and Contour 2), respectively.

Figure 12A:
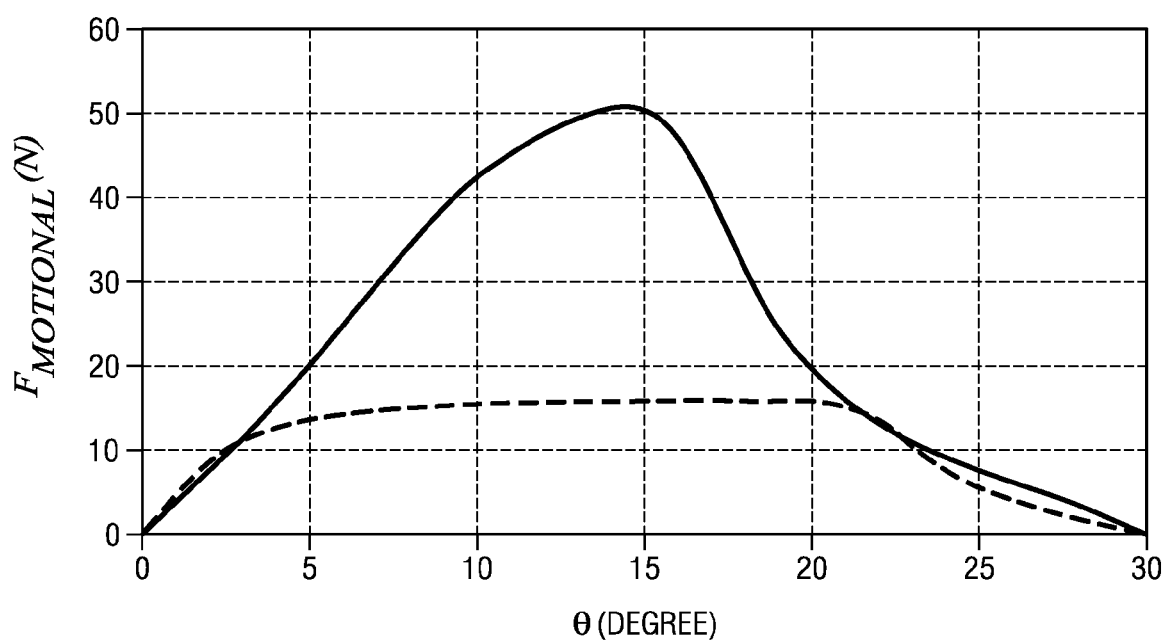
FIG. 12A is a graph illustrating the motional force generated at various rotor positions, when the current is set to 10 A, by a switched reluctance apparatus in accordance with some embodiments of the present invention, compared to that generated by a prior art switched reluctance machine.
Figure 12B:
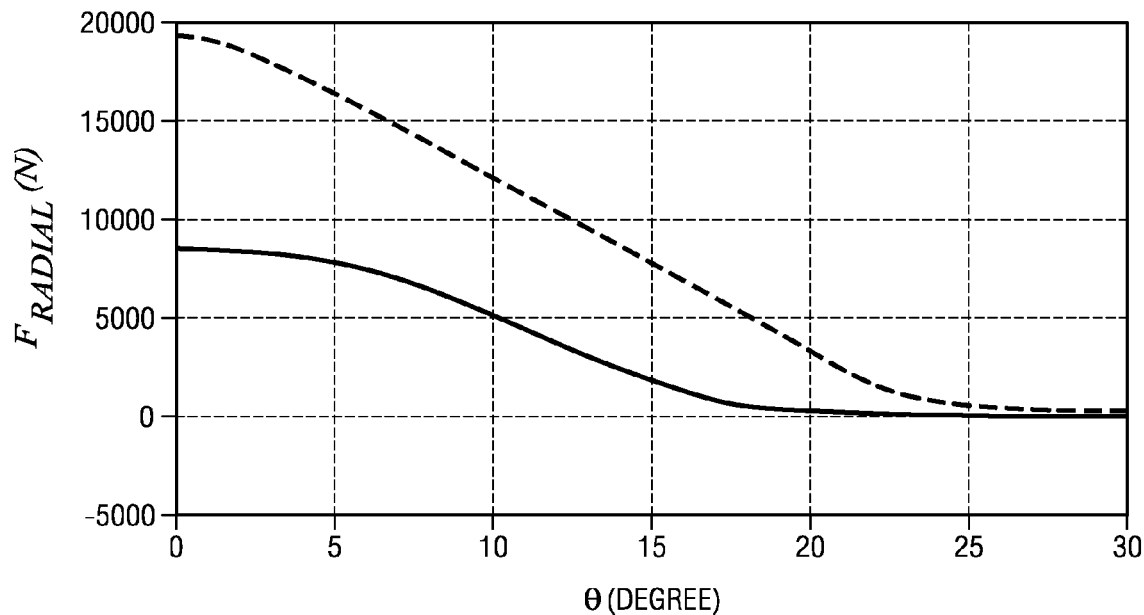
FIG. 12B is a graph illustrating the radial force generated at various rotor positions, when the current is set to 10 A, by a switched reluctance apparatus in accordance with some embodiments of the present invention, compared to that generated by a prior art switched reluctance machine.

The inventors of the instant application calculated $F_{Motional}$ and $F_{Radial}$ in switched reluctance apparatus 100 at various rotor positions, when the current of phase "a" ($i_a$) is set to 10 A. Using a finite element analysis, the net motional force and total normal force produced in conventional switched reluctance machine 700 was also calculated, when the current of phase "a" is set to 10 A. FIGS. 12A and 12B illustrate $F_{Motional}$ and $F_{Radial}$ in these two machines at various rotor positions for a current of 10 A. The results show that switched reluctance apparatus 100 can produce more motional force, while its radial force is much less, than conventional switched reluctance machine 700.

Figure 12C:
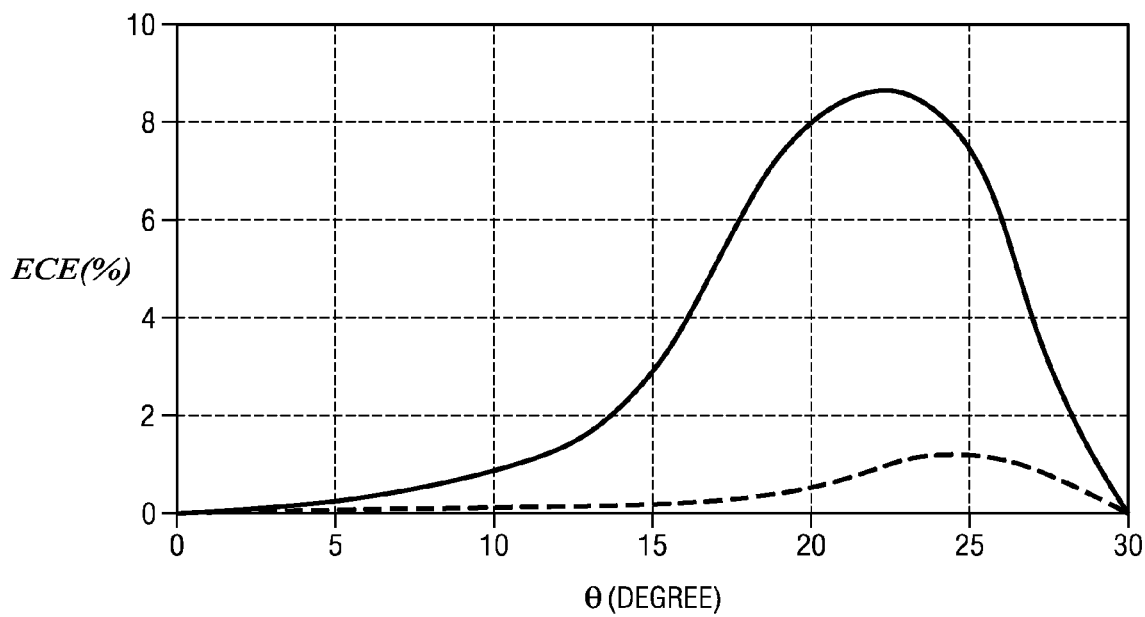
FIG. 12C is a graph illustrating the energy conversion efficiency at various rotor positions, when the current is set to 10 A, of a switched reluctance apparatus in accordance with some embodiments of the present invention, compared to that of a prior art switched reluctance machine.
Figure 12D:
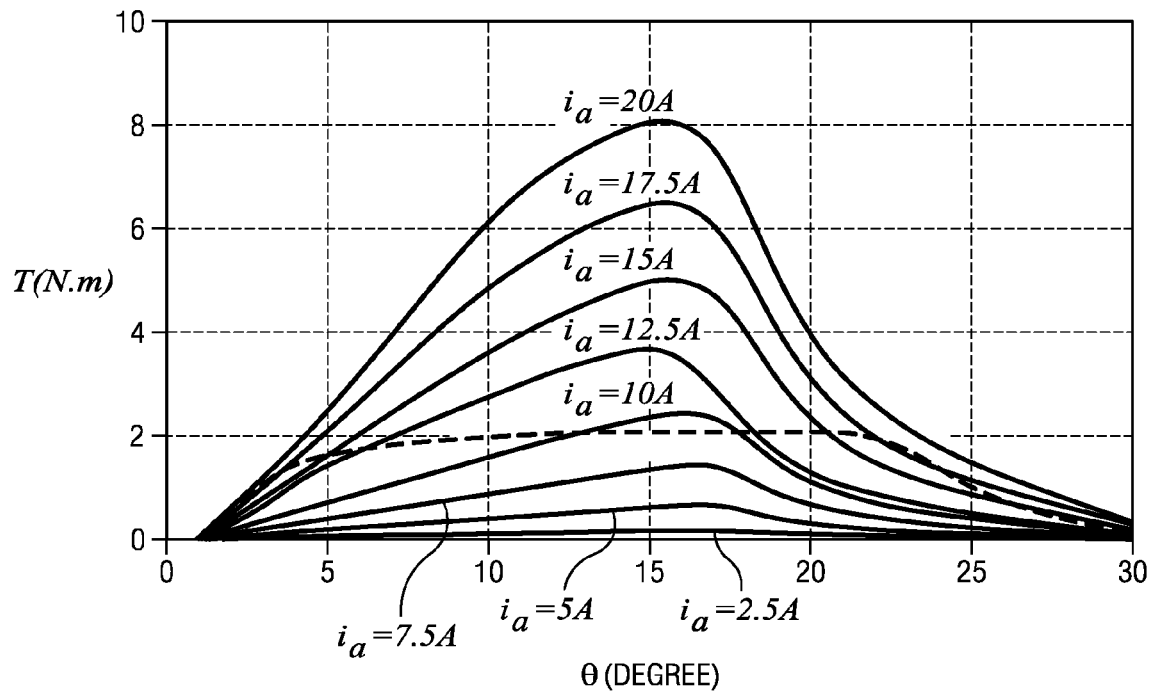
FIG. 12D is a graph illustrating torque generated at various rotor positions, by a switched reluctance apparatus in accordance with some embodiments of the present invention, compared to that generated by a prior art switched reluctance machine.

Based on equation (3), the ECE of conventional switched reluctance machine 700 and switched reluctance apparatus 100 at various rotor positions were calculated, when the current of phase "a" is set to 10 A. The results, shown in FIG. 12C, confirm that the new configuration of switched reluctance apparatus 100 yields a much higher ECE than that of conventional switched reluctance machine 700. For example, as shown in FIG. 12C, when the current is set to 10 A, for certain rotor positions between θ=20° and θ25°, switched reluctance apparatus 100 achieves an ECE of approximately 8% or higher as compared to an ECE of under 2% for conventional switched reluctance machine 700. Finally, FIG. 12D illustrates torque of switched reluctance apparatus 100 at various rotor positions for $i_a$=2.5 A to $i_a$=20 A, along with torque of conventional switched reluctance machine 700 for $i_a$=20 A. Again, switched reluctance apparatus 100 shows greatly improved performance compared to conventional switched reluctance machine 700.

The phase inductance is a fundamental parameter that can be used to describe the behavior of switched reluctance apparatus 100. To measure inductance, the rotor was locked in known rotor positions (from the aligned to completely unaligned position) using an index head. In each position, current was monitored when a voltage pulse was applied to the phase winding. The experimental data of phase voltage and current were recorded by a digital oscilloscope. Using the recorded data, the phase inductance was calculated using the following formula:

$$L = \frac{tR}{\ln\left(\frac{I}{I - i_a}\right)} \quad (5)$$

where L is the phase inductance, t is time lapsed after the voltage is applied, I is the steady state current, $i_a$ is the phase current at t, and R is the resistance per phase. The method works well if the current doesn't saturate the core ($i_a$<10 A). Corresponding theoretical values of the inductance were also calculated using a finite element analysis. A comparison of the results is shown in FIG. 13, showing a good match between the experimental and theoretical values of the phase inductance, at various rotor positions, for $i_a$<10 A.

Regarding the above comparisons of switched reluctance apparatus 100 and conventional switched reluctance machine 700, although a one-to-one correspondence between all design parameters of the two machines is impossible, care was taken to maintain the same stack length, same outer diameter, same wire gauge and phase current amplitude, and same overall mass (copper and iron combined). The individual airgap length in the radial direction separating the stator/s and rotor was kept at 1 mm in both machines. However, it may be noted that this is advantageous to the conventional switched reluctance machine 700 as the inherent short flux path in switched reluctance apparatus 100 results in a larger effective airgap reluctance. The parameters of conventional switched reluctance machine 700 and switched reluctance apparatus 100 are given below in Tables I and II, respectively.

TABLE I

| | |
|---|---|
| Number of stator poles | 8 |
| Number of rotor poles | 6 |
| Number of phases | 4 |
| Outer radius of stator | 72.0 mm |
| Outer radius of rotor | 38.3 mm |
| Airgap | 1.0 mm |
| Stack length | 115.0 mm |
| Number of turns per phase | 32 |
| Rated current | 30 A |
| Rated voltage | 100 V |
| Stator winding material | copper |
| Lamination material | M19 |
| Mass of copper | 1.8 kg |
| Mass of iron | 6.3 kg |

Parameters of conventional switched reluctance machine 700

TABLE II

| | |
|---|---|
| Number of stator poles | 8 |
| Number of rotor poles(Segments) | 6 |
| Number of phases | 4 |
| Outer radius of outer stator | 72.0 mm |
| Outer radius of inner stator | 43.9 mm |
| Rotor segment thickness | 9.0 mm |
| Airgap 1 and Airgap 2 | 1.0 mm |
| Stack length | 115.0 mm |
| Arc of the rotor segments | 47 degree |
| Number of turns per phase | 50 |
| Rated current | 30 A |
| Rated voltage | 100 V |
| Resistance per phase | 0.78 Ω |
| Stator winding material | copper |
| Lamination material | M19 |
| Mass of copper | 3.1 kg |
| Mass of iron | 5.0 kg |

Parameters of switched reluctance apparatus 100

In addition to the seven aspects of the invention set forth above in the Summary section, the following additional aspects of the invention are set forth below.

According to an eighth aspect of the invention, any of the other aspects is characterized in that the excitation of any given phase of the apparatus causes only eight poles of the stators and portions of only two segments of the rotor to be magnetized.

According to a ninth aspect of the invention, any of the other aspects is characterized in that the inner stator is cylindrical having a cylindrical axis, and the plurality of poles of the inner stator is an even number of salient poles spaced at equal angular intervals about the cylindrical axis thereof, the rotor comprises a cylindrical cage having a cylindrical axis, and the plurality of segments is an even number of non-projecting segments housed in the cylindrical cage and spaced at equal angular intervals about the cylindrical axis thereof, the outer stator is cylindrical having a cylindrical axis, and the plurality of poles of the outer stator is an even number of salient poles spaced at equal angular intervals about the cylindrical axis thereof. The number of poles of the inner stator is equal to the number of poles of the outer stator, and the poles of the inner and outer stators correspond to each other by virtue of being disposed at corresponding angular positions about the respective cylindrical axes of the respective stators. The number of poles of either stator is equal to, greater than, or smaller than the number of segments. The windings corresponding to any given phase are connected in series and are electrically isolated from the other windings. Each phase corresponds also to a respective subset of the poles.

According to a tenth aspect of the invention, any of the other aspects is characterized in that the apparatus thereof may be operated as either a motor or a generator. The apparatus is adapted to operate as a motor by exciting the phases during a region of rising inductance, and as a generator by exciting the phases during a region of decreasing inductance.

According to an eleventh aspect of the invention, any of the other aspects is characterized in that the poles of the inner and outer stators correspond to each other by virtue of being disposed at corresponding angular positions about the respective cylindrical axes of the respective stators, and each phase corresponds to a group of poles and windings comprising a respective pair of adjacent poles of the inner stator, a pair of poles of the inner stator diametrically opposed to the respective pair of adjacent poles of the inner stator, a pair of poles of the outer stator corresponding to the respective pair of adjacent poles of the inner stator, a pair of poles of the outer stator diametrically opposed to the pair of poles of the outer stator corresponding to the respective pair of adjacent poles of the inner stator, and the windings disposed between the four pairs of poles, respectively, of the group.

According to a twelfth aspect of the invention, the fourth aspect is further characterized in that the prevention of the substantial amount of the flux lines from entering the ones of the segments in a radial direction and the causing of the substantial amount of the flux lines to enter the ones of the segments in the direction normal to the radial direction is sufficient to realize an energy conversion efficiency of the apparatus of approximately 8% at given angular positions of the rotor, when a current energizing the windings of a given phase is set at 10 amperes.

According to a thirteenth aspect of the invention, any of the other aspects is characterized in that a given phase is excited when two of the segments are located between an aligned position and an unaligned position with respect to the given phase.

According to a fourteenth aspect of the invention, any of the other aspects is characterized in that the plurality of phases is three or more phases.

According to a fifteenth aspect of the invention, the fifth aspect is further characterized in that each phase excited subsequently in the sequence is defined as a phase corresponding to ones of the poles and windings that are circumferentially adjacent, in a given angular direction, to the poles and windings, respectively, of the phase excited previously in the sequence.

As will be understood by one of ordinary skill in the art, all combinations of any two or more of the foregoing fifteen aspects, and/or of any two or more subsets of any number of characteristics, features, or elements of the foregoing fifteen aspects, are possible, except where the description hereinabove indicates otherwise or where one of ordinary skill in the art would clearly understand otherwise. In this regard, the fact that a given aspect or subset thereof includes content already included in another aspect or subset thereof does not preclude an otherwise permissible combination of the two aspects, it being understood that such combination may be made while including only non-repetitive content.

All of the methods and apparatuses disclosed and claimed herein may be made and executed without undue experimentation in light of the present disclosure. While the methods and apparatuses of this invention have been described in terms of particular embodiments, it will be apparent to those skilled in the art that variations may be applied to the methods and apparatuses and in the steps or in the sequence of steps of the methods described herein without departing from the concept, spirit, and scope of the invention, as defined by the appended claims.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown other than as described in the claims below. It is, therefore, evident that the particular embodiments disclosed above may be altered or modified and all such variations are considered within the scope and spirit of the invention. Accordingly, the protection sought herein is as set forth in the claims below.

What is claimed is:

1. A switched reluctance apparatus comprising:
   an inner stator having a plurality of poles;
   a rotor disposed radially outward of the inner stator and having a plurality of segments serving as poles; and
   an outer stator disposed radially outward of the rotor and having a plurality of poles,
   wherein the rotor is configured for rotation with respect to the inner and outer stators,
   wherein, between every pair of adjacent poles of either stator, a respective winding is disposed,
   wherein the apparatus is configured to operate as a machine having a plurality of separately excitable phases, each phase corresponding to a respective diametric subset of the windings, and a given phase being excited by energizing the windings corresponding to the given phase,
   wherein each diametric subset of the windings for each phase further comprises a set of diametrically opposed inner stator windings, and a set of diametrically opposed outer stator windings adjacent to the set of diametrically opposed inner stator windings, and
   wherein exciting any given phase induces magnetic fluxes, a substantial amount of flux lines thereof being prevented from entering ones of the segments in a radial direction and a substantial amount of flux lines thereof being caused to enter ones of the segments in a direction normal to the radial direction.

2. The switched reluctance apparatus of claim 1,
   wherein the prevention of the substantial amount of the flux lines from entering the ones of the segments in a radial direction and the causing of the substantial amount of the flux lines to enter the ones of the segments in the direction normal to the radial direction is sufficient to realize an energy conversion efficiency of the apparatus of approximately 8% at given angular positions of the rotor, when a current energizing the windings of a given phase is set at 10 amperes.

3. The switched reluctance apparatus of claim 1,
   wherein the inner stator is cylindrical having a cylindrical axis, and the plurality of poles of the inner stator is an even number of salient poles spaced at equal angular intervals about the cylindrical axis thereof,
   wherein the rotor comprises a cylindrical cage having a cylindrical axis, and the plurality of segments is an even number of non-projecting segments housed in the cylindrical cage and spaced at equal angular intervals about the cylindrical axis thereof,
   wherein the outer stator is cylindrical having a cylindrical axis, and the plurality of poles of the outer stator is an even number of salient poles spaced at equal angular intervals about the cylindrical axis thereof, wherein each of the stators and segments comprises a respective laminated soft ferromagnetic material, and the cylindrical cage is formed of a non-ferromagnetic material, wherein the number of poles of the inner stator is equal to the number of poles of the outer stator, and the poles of the inner and outer stators correspond to each other by virtue of being disposed at corresponding angular positions about the respective cylindrical axes of the respective stators, wherein the number of poles of either stator is equal to, greater than, or smaller than the number of segments, wherein the windings corresponding to any given phase are connected in series and are electrically isolated from the other windings, and wherein each phase corresponds also to a respective subset of the poles.

4. The switched reluctance apparatus of claim 1, wherein the apparatus is operable as a motor or as a generator.

5. The switched reluctance apparatus of claim 1, wherein when a phase is excited, current of the outer stator windings of the phase flows in an opposite direction of current of the inner stator windings of the phase; and wherein when a phase is excited, a pole of the rotor aligns with a pair of adjacent poles of the outer stator of the phase and a corresponding pair of adjacent poles of the inner stator of the phase.

\* \* \* \* \*